(12) United States Patent
Nai

(10) Patent No.: US 12,554,283 B2
(45) Date of Patent: Feb. 17, 2026

(54) CLOCK DOMAIN CROSSING SYNCHRONIZATION CIRCUITS AND METHODS TO GUARANTEE PROPER DATA SIGNAL ORDER

(71) Applicant: STMicroelectronics International N.V., Geneva (CH)

(72) Inventor: Alexis Rithy Maxime Nai, Aix en Provence (FR)

(73) Assignee: STMicroelectronics International N.V., Geneva (CH)

( * ) Notice: Subject to any disclaimer, the term of this patent is extended or adjusted under 35 U.S.C. 154(b) by 119 days.

(21) Appl. No.: 18/227,671

(22) Filed: Jul. 28, 2023

(65) Prior Publication Data

US 2025/0036159 A1    Jan. 30, 2025

(51) Int. Cl.
*G06F 1/12* (2006.01)
*G06F 1/04* (2006.01)
*G06F 13/42* (2006.01)

(52) U.S. Cl.
CPC .............. *G06F 1/12* (2013.01); *G06F 1/04* (2013.01); *G06F 13/4273* (2013.01)

(58) Field of Classification Search
CPC ........... G06F 1/04; G06F 1/12; G06F 13/4273
See application file for complete search history.

(56) References Cited

U.S. PATENT DOCUMENTS 5,905,766 A * 5/1999 Nguyen ................ H04L 7/0045
375/372

6,033,441 A * 3/2000 Herbert ...................... G06F 5/10
713/400

(Continued)

FOREIGN PATENT DOCUMENTS

| CN | 111324562 A | 6/2020 |
|---|---|---|
| CN | 114168503 A | 3/2022 |

OTHER PUBLICATIONS

Texas Instruments OMAP Family of Products, "OMAP35xx Applications Processor Multimedia Card/Secure Digital/Secure Digital I/o (MMC/SD/SDIO) Card Interface," Technical Reference Manual, Feb. 2008, 105 pages.

(Continued)

*Primary Examiner* — Jaweed A Abbaszadeh
(74) *Attorney, Agent, or Firm* — Slater Matsil, LLP

(57) ABSTRACT

Clock domain crossing synchronization circuits and methods include generating a destination domain current buffer signal in a destination clock domain. The destination domain current buffer signal indicates a first or second data buffer in a source clock domain as a current buffer for use during a current data transfer cycle. The destination domain current buffer signal is synchronized and a source domain current buffer signal indicating the current buffer generated. A source data transfer request signal is generated based on the source domain current buffer signal and the source data transfer request signal synchronized to generate a destination domain data transfer request signal. Transfer of data between a memory in the destination clock domain is delayed to a subsequent data transfer cycle when the current buffer associated with the destination domain data transfer request signal does not correspond to the current buffer indicated by the destination domain current buffer signal.

20 Claims, 11 Drawing Sheets

(56) References Cited

U.S. PATENT DOCUMENTS

| | | | |
|---|---|---|---|
| 6,055,597 A * | 4/2000 | Houg | G06F 13/4059 |
| | | | 710/66 |
| 7,352,836 B1 * | 4/2008 | Mendenhall | G06F 5/06 |
| | | | 375/372 |
| 7,725,638 B2 | 5/2010 | Zhang et al. | |
| 10,275,371 B2 | 4/2019 | Lee et al. | |
| 10,467,175 B1 | 11/2019 | Haldar et al. | |
| 11,138,115 B2 | 10/2021 | Li | |
| 11,573,700 B2 | 2/2023 | Bavishi et al. | |
| 2003/0007394 A1 * | 1/2003 | Phi | G11C 7/1072 |
| | | | 365/200 |
| 2003/0081713 A1 * | 5/2003 | Pontius | H04L 7/005 |
| | | | 375/372 |
| 2010/0111117 A1 * | 5/2010 | Kolinummi | G06F 13/4059 |
| | | | 370/503 |
| 2010/0316142 A1 | 12/2010 | Tsuchiya | |
| 2013/0013950 A1 * | 1/2013 | Maddigan | H04L 7/005 |
| | | | 713/400 |
| 2013/0254583 A1 * | 9/2013 | Rifani | G06F 1/12 |
| | | | 713/400 |
| 2015/0085587 A1 | 3/2015 | Vallapaneni | |
| 2015/0149809 A1 * | 5/2015 | Feero | G06F 13/4059 |
| | | | 713/600 |
| 2019/0026241 A1 | 1/2019 | Schumacher | |

OTHER PUBLICATIONS

Extended European Search Report, Application No. 24188539.1-1218, mailed Dec. 23, 2024, 9 pages.

\* cited by examiner

CLOCK DOMAIN CROSSING SYNCHRONIZATION CIRCUITS AND METHODS TO GUARANTEE PROPER DATA SIGNAL ORDER

The present disclosure relates generally to the synchronization of data signals in systems having multiple clock domains, and more specifically to clock domain crossing circuits and methods to guarantee proper data signal ordering when communicating data signals across clock domains.

BACKGROUND

In certain electronic environments, data must be transferred between two different clock domains, which will be referred to herein as a destination clock domain and a source clock domain. Each clock domain corresponds to a collection of components or circuits that are driven by the same clock signal, or by a group of clock signals that are related to each other (e.g., a group of clock signals derived from the same source or root clock signal). Clock domain crossings where data signals must be transferred between a source clock domain and destination clock domain may present metastability, data loss, and data coherency issues.

Clock domain crossing circuitry for synchronizing data signals between the source and destination clock domains may include double buffers in the source clock domain to increase the bandwidth of the interface provided by the clock domain crossing circuitry. In this situation, the destination clock domain must be able to determine the proper one of the double buffers to transfer data to or from to ensure data coherency and to ensure data transfer requests from the source clock domain are not missed in the destination clock domain. While conventional clock domain crossing circuitry includes synchronization circuitry for synchronizing data transfer requests (i.e., read and write requests) generated in the source clock domain and associated with one of the double buffers, these conventional synchronization circuits may not properly order (i.e., preserve the order of) the data transfer requests in the destination clock domain. This may result in the wrong one of the double buffers being utilized (i.e., data incoherency) or the loss entirely of a data transfer request from the source clock domain (data loss). Improved clock domain crossing circuits and methods are accordingly needed for such electronic environments.

SUMMARY

In accordance with one embodiment of the present disclosure, a method includes generating a destination domain current buffer signal in a destination clock domain, the destination domain current buffer signal having a value indicating which one of a first data buffer and a second data buffer in a source clock domain is a current buffer to be utilized during a current data transfer cycle. The method includes synchronizing the destination domain current buffer signal in the source clock domain to generate a synchronized destination domain current buffer signal and generating a source domain current buffer signal based on the synchronized destination domain current buffer signal. The generated source domain current buffer signal has a value indicating the current buffer. The method further includes generating a source data transfer request signal in the source clock domain based on the source domain current buffer signal, where the source data transfer request signal is associated with the current buffer indicated by the source domain current buffer signal. The source data transfer request signal is synchronized in the destination clock domain to thereby generate a destination domain data transfer request signal and the method includes delaying the transfer of data between a FIFO memory in the destination clock domain to a subsequent data transfer cycle when the current buffer associated with the destination domain data transfer request signal does not correspond to the current buffer indicated by the destination domain current buffer signal.

In accordance with another embodiment of the present disclosure, a clock domain crossing synchronization circuit includes a destination current buffer generator in a destination clock domain. The destination current buffer generator is configured to generate a destination domain current buffer signal having a value indicating whether a first data buffer or a second data buffer is a current buffer to be utilized in a current data transfer cycle. A first synchronization circuit is configured to receive the destination current buffer signal and to generate a corresponding synchronized destination current buffer signal in a source clock domain. A source current buffer generator configured to generate a source domain current buffer signal based on the synchronized destination current buffer signal, where the source domain current buffer signal has a value indicating the current buffer. A source data transfer request generator is configured to receive the source domain current buffer signal and to generate a source data transfer request signal in the source clock domain based on the source domain current buffer signal. The generated source data transfer request signal associated with the current buffer indicated by the source domain current buffer signal. A second synchronization circuit configured to receive the source data transfer request signal and to generate a corresponding synchronized destination domain data transfer request signal in the destination clock domain. A destination data transfer request and delay generator in the destination clock domain and configured to receive the synchronized source data transfer request signal and the destination domain current buffer signal. The destination data transfer request and delay generator is configured to delay the transfer of data between a memory in the destination clock domain and the current buffer to a subsequent data transfer cycle when the current buffer indicated by the destination domain data transfer request signal does not correspond to the current buffer indicated by the destination domain current buffer signal.

In accordance with a further embodiment of the present disclosure, an electronic system includes the clock domain crossing synchronization circuit, a first in, first out (FIFO) memory forming the memory in the destination clock domain, and a double buffer including the first data buffer and the second data buffer in the source clock domain. The source clock domain may be a secure digital (SD) clock domain and the destination clock domain an advanced hardware (AHB) bus clock domain.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

In the following description one or more specific details are illustrated, aimed at providing an understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

Electronic systems can be implemented as a System on a Chip (SoC) that is an integrated circuit including all of required components of a system, often including, for example, components associated with different and asynchronous clock domains. A clock domain crossing occurs when data is transferred across clock domains, such as from a flip-flop (a source flip-flop) driven by a source domain clock to a flip-flop (a destination flip-flop) driven by a destination domain clock. Depending on the relationship between the clocks, problems may arise in the data transfer between the source flip-flop and the destination flip-flop. As an example, if a transition at output of the source flip-flop occurs very close to the active edge of the second clock, a setup or hold violation at the destination flip-flop may occur. This may lead to the output of the second flip-flop to oscillate, become unstable, and may not settle down to a stable value before the next active edge of the second clock. This condition is referred to as metastability, and is potential issue at a clock domain crossing, along with data incoherency and data loss issues that also may arise at a clock domain crossing.

Figure 1A:
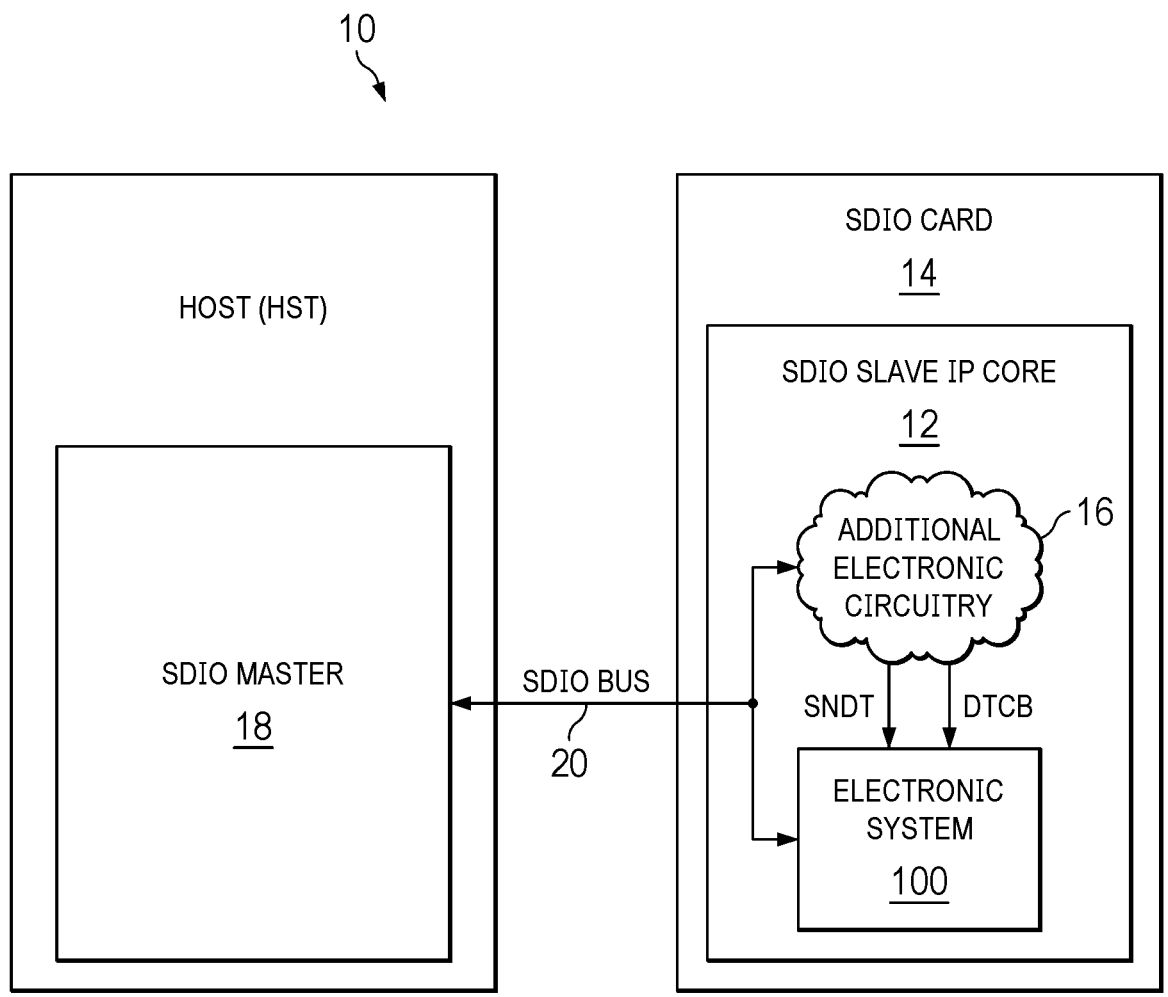
FIG. 1A is a functional block diagram illustrating an example environment of an electronic system in which clock domain crossing synchronization circuits according to embodiments of the present disclosure may be implemented.

FIG. 1A is a functional block diagram illustrating an example environment 10 of an electronic system 100 in which clock domain crossing synchronization circuits according to embodiments of the present disclosure may be implemented. The specific example environment 10 of the electronic system 100 in FIG. 1A is the secure digital (SD) environment where a source clock domain SCD is an SD clock domain and a destination clock domain DCD is an advanced hardware bus (AHB) clock domain. Secure digital (SD) is a proprietary format for various types of memory cards utilized in mobile devices, and SD input/output (SDIO) cards are an extension of this standard and include IO functionality in addition to memory storage, as well as a built-in controller that allows them to communicate with a host device HST and provide expanded functionality beyond mere memory storage.

In the SDIO environment 10, the electronic system 100 may be part of an intellectual property (IP) core 12 of an SDIO slave in an SDIO card 14, where the SDIO card may include multiple SDIO slaves and where the IP core is a functional block of reusable electronic circuitry. The IP core 12 of each SDIO slave, which may be referred to as an SDIO slave IP core 12, includes additional electronic circuitry 16 along with the electronic system 100. This additional electronic circuitry 16, including the electronic system 100, may be formed through suitable hardware, firmware, or software, and combinations thereof. The additional electronic circuitry 16 contained in each SDIO slave IP core 12 processes requests, such as data transfer requests like read and write requests, received from the host device HST. More specifically, an SDIO master controller 18 in the hose device HST supplies requests, such as data transfer requests like read and write requests, over an SDIO bus 20 to the SDIO slave IP core 12 in the SDIO card 14. The additional electronic circuitry 16 in the SDIO slave IP core 12 processes the data transfer request from the host device HST and generates signals that are supplied to control operation of the electronic system 100 in handling the transfer of data component of the request. The signals generated by the SDIO slave IP core 12 include a start new data transfer request signal SNDT and a data transfer current buffer signal DTCB, which will be described in more detail with reference to the embodiments of FIGS. 3-7.

Figure 1B:
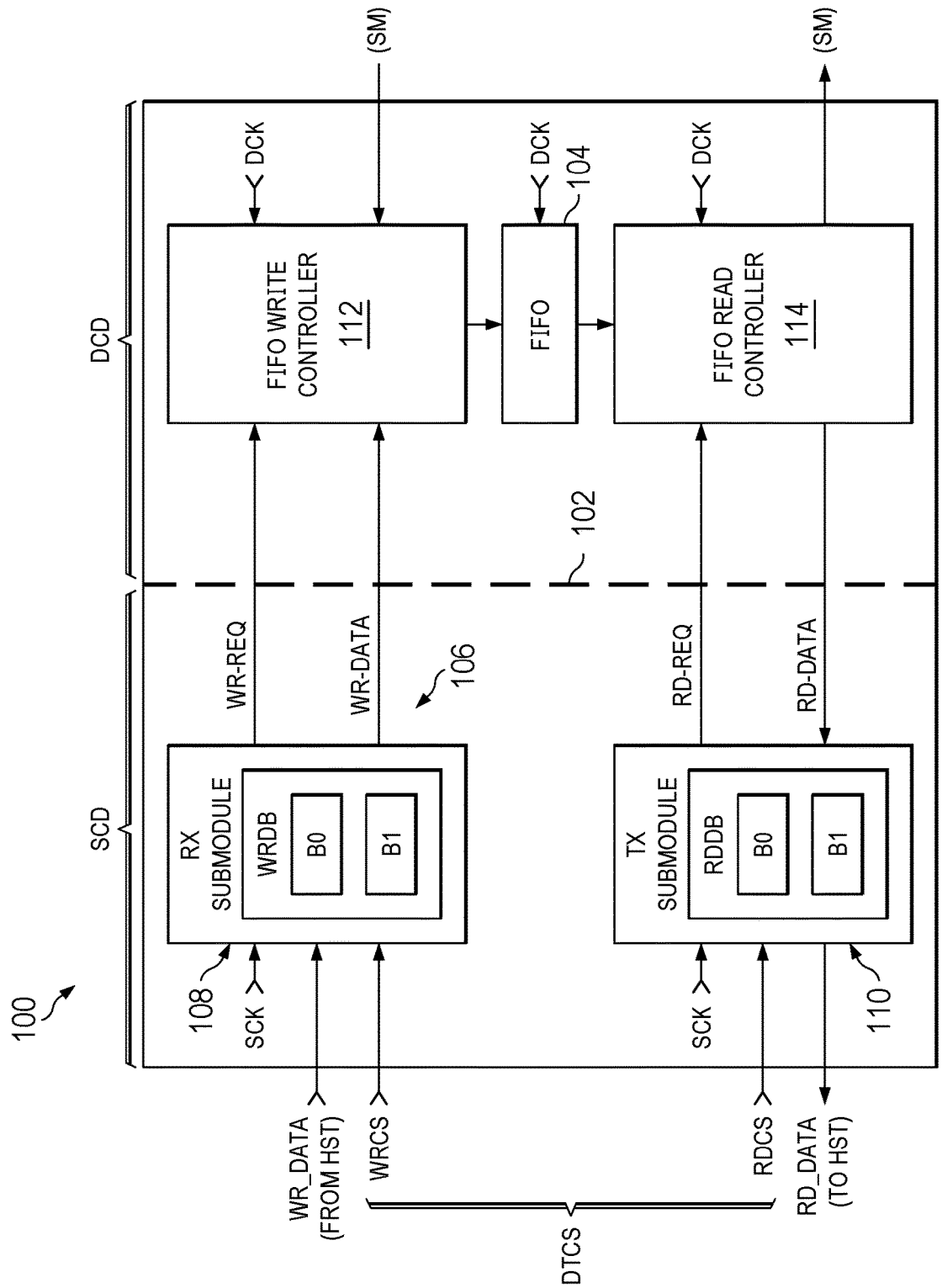
FIG. 1B is a more detailed functional block diagram illustrating the electronic system of FIG. 1A according to one embodiment of the present disclosure.

FIG. 1B is a more detailed functional block diagram of the electronic system 100 of FIG. 1A according to one embodiment of the present disclosure. The electronic system 100 has a source clock domain SCD and a destination clock domain DCD, with a vertical dashed line 102 representing the border or crossing between these two clock domains. The SDIO environment 10 of FIG. 1A is an example of an environment in where the electronic system 100 includes a memory, which is a first in, first out (FIFO) memory 104 embodiment of FIG. 1B. The FIFO memory 104 is in the destination clock domain DCD and is utilized to communicate data to the source clock domain SCD through double buffers WRDB, RDDB in the source clock domain.

In this environment, utilization of the single FIFO memory 104 reduces the size of the required clock domain crossing synchronization circuitry for interfacing the SD and AHB clock domains. The clock domain crossing synchronization circuitry utilizes the double buffers WRDB, RDDB in an alternate or "ping-pong" manner to transfer data between the SCD and AHB domains and in this way the double buffers increase the bandwidth of the data transfer interface between the two clock domains.

In operation, the host device HST (FIG. 1A) sends host data transfer requests in the form of host read requests and host write requests over the SDIO bus 20 to the SDIO card 14. The additional electronic circuitry 16 processes the request and generates signals, including the SNDT, DTCB signals shown in FIG. 1A, to thereby control operation of the electronic system 100 in handling the received request. More specifically, the additional electronic circuitry 16 provides data transfer control signals DTCS to a controller 106 of the electronic system 100 in the source clock domain SCD, where the data transfer control signals include write control signals WRCS and read control signals RDCS. The host device HST and controller 106 operate in the source clock domain SCD.

The controller 106 includes a receive (RX) submodule 108 for processing the write control signals WRCS generated by the additional electronic circuitry 16 in response to a write request received from the host device HST. The controller 106 also includes a transmit (TX) submodule 11o for processing the read control signals RDCS generated by the additional electronic circuitry 16 in response to a read request received from the host device HST. The write double buffer WRDB is contained in the RX submodule 108 and the read double buffer RDDB contained in the TX submodule 110. Each double buffer WRDB, RDDB includes two data buffers, which are designated data buffers B0 and B1 in FIG. 1. The submodules 108, 11o in the source clock domain SCD are clocked by a source domain clock signal SCK while controllers 112, 114 and the FIFO memory 104 in the destination domain clock domain DCD are clocked by a destination domain clock signal DCK.

In processing a host write request, the SDIO card 14 (FIG. 1A) receives the write request via SDIO bus 20 from the host device HST. The SDIO bus 20 (FIG. 1A) is connected directly between the RX submodule 108 and TX submodule 110, and the host write request includes write data WR_DATA from the host device HST. The write data WR_DATA from the host device HST is supplied over the SDIO bus 20 to the RX submodule 108 as seen in FIG. 1B. The additional electronic circuitry 16 supplies the WRCS signals to the RX submodule 108 to indicate to the RX submodule that it will be receiving write data WR-DATA and will need to process that write data as part of the write request. In response to the WRCS signal, the RX submodule 108 issues an internal write request WR-REQ along with write data WR-DATA from the one of the buffers B0, B1 of the double buffer WRDB that is designated as the current buffer during a given data transfer cycle. The operation of the data buffers B0, B1 of the write double buffer WRDB, as well as the read data buffer RDDB, will be described in more detail below. The internal write request WR-REQ and write data WR-DATA are issued in the SCD clock domain to a FIFO write controller 112 in the destination clock domain DCD (e.g., AHB clock domain). The FIFO write controller 112 processes the internal WR-REQ request and write data WR-DATA, and handles writing the WR-DATA data from the current buffer B0 or B1 of the write double buffer WRDB into the FIFO memory 104. The FIFO read controller 114 processes received read data as part of a read request, as will now be described in more detail below.

Similarly, in processing a host read request, the SDIO card 14 receives a read request via SDIO bus 20 from the host device HST. The host read request includes read data RD_DATA from the host device HST. The read data RD_DATA from the host device HST is supplied over the SDIO bus 20 (FIG. 1A) to the TX submodule 11o as seen in FIG. 1B. The additional electronic circuitry 16 supplies the RDCS signals to the TX submodule 11o to indicate to the TX submodule that it will be receiving read data RD_DATA and will need to process that read data as part of the read request. In response to the RDCS signals, the RX submodule 11o issues an internal read request RD-REQ from the SCD clock domain to the FIFO read controller 114 in the DCD clock domain, and the FIFO read controller processes the internal RD-REQ request and accesses read RD-DATA in the FIFO memory 104 and provides this read data to the one of the buffers B0, B1 of the read double buffer RDDB in the TX submodule 11o which is the current buffer. The TX submodule 11o thereafter provides the read data RD-DATA for transfer from the SDIO card 14 over the SDIO bus 20 to the host device HST.

In transferring data signals between the SD and AHB clock domains, synchronization techniques must be implemented to prevent metastability, data loss, and data coherency issues as mentioned above. Recall, in the SD environment the SD clock domain is the source clock domain SCD and the AHB clock domain is the destination clock domain. Thus, both write requests WR-REQ and read requests RD-REQ from the submodules 108, 11o in the SD clock domain must be resynchronized in the AHB clock domain to ensure proper operation.

Accordingly, while not expressly shown in FIG. 1, each of the RX, TX submodules 108, 11o and FIFO write controller 112, FIFO read controller 114 include portions of clock domain crossing synchronization circuitry that function to resynchronize signals being communicated between the SD and AHB clock domains. Additional submodules SM, such as additional submodules RX submodule 108 and TX submodule 110, may be connected to each of the FIFO write controller 112 and FIFO read controller 114.

Figure 2:
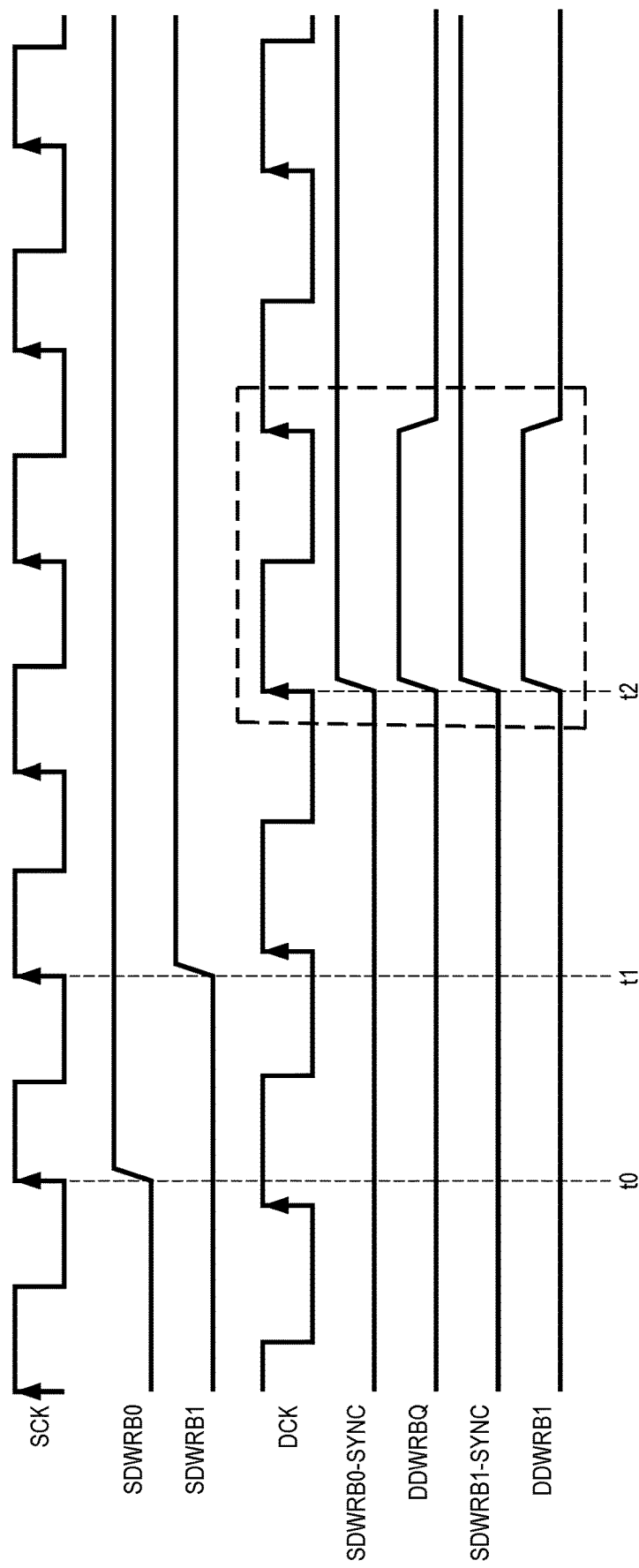
FIG. 2 is a signal timing diagram illustrating the loss of proper ordering of data transfer requests that may occur with conventional clock domain crossing circuits in the electronic system of FIG. 1.

FIG. 2 is a signal timing diagram illustrating the loss of proper ordering of data transfer requests that may occur with conventional synchronization techniques implemented by conventional clock domain crossing circuits in the electronic system 100 of FIG. 1. Although not shown in FIG. 1, each of the write request WR-REQ and read request RD-REQ signal from the submodules 108, 110 in the SD clock domain is directed to the current buffer of the buffers B0, B1. FIG. 2 illustrates a write request byway of example. The RX submodule 108 generates the write request WR-REQ that includes a source domain write first buffer signal SDWRB0 and a source domain write second buffer signal SDWRB1. The RX submodule 108 activates only the buffer signal WRB0, WRB1 for the one of the buffers B0, B1 that is the current buffer. In the example of FIG. 2, the source domain write first buffer signal SDWRB0 is activated first at a time to when the buffer B0 is indicated as being the current buffer in the source clock domain SCD. The source domain write second buffer signal SDWRB1 is then activated later at a time t1 when the buffer B1 is indicated as being the current buffer in the source clock domain SCD.

Conventional clock domain synchronization circuitry in the FIFO write controller 112 resynchronize the SDWRB0, SDWRB1 signals in the destination clock domain as synchronized source domain write buffer signals SDWRB0-SYNC, SDWRB1-SYNC in the destination clock domain, but the proper order of the SDWRB0, SDWRB1 signals is not guaranteed with such conventional clock domain synchronization circuitry. This conventional clock domain synchronization circuitry FIFO write controller 112 then generates destination domain write buffer signals DDWRB0, DDWRB1 from, or in response to, the synchronized source domain write buffer signals SDWRB0-SYNC, SDWRB1-SYNC. The FIFO write controller 112 thereafter applies the DDWRB0, DDWRB1 signals to the FIFO memory 104 to store write data contained in the current buffer B0, B1 of the write double buffer WRDB in the FIFO memory.

As illustrated in FIG. 2, conventional clock domain crossing circuitry in the FIFO write controller 112 may not properly keep the order of the generated source domain write buffer signals SDWRB0-SYNC, SDWRB1-SYNC in the destination clock domain DCD. This, in turn, results in improper generation of the DDWRB0, DDWRB1 signals as well. FIG. 2 illustrates a possible scenario where both the synchronized source domain write buffer signal SDWRB0 and synchronized source domain write buffer signal SDWRB1-SYNC occur at a same time t2 in the destination clock domain DCD. Signals in the destination clock domain DCD are synchronized with the destination domain clock signal DCK, but due to both the DDWRB0, DDWRB1 signals occurring at time t2, proper operation will not occur. The write operation associated with one of the DDWRB0, DDWRB1 signals and write data stored in the corresponding data buffer B0, B1 may be lost, or the order write operations may reversed.

Embodiments of the present disclosure are directed to clock domain crossing synchronization circuits and methods that ensure the proper ordering of signals and operation in electronic environments such as that of the electronic system 100 of FIG. 1 in which data is transferred between the FIFO memory 104 in the destination clock domain DCD and a current buffer in the source clock domain SCD. The current buffer is the one of the data buffers B0, B1 in double buffer WRDB, RDDB that is being utilized to transfer data during or in a current data transfer cycle. Embodiments of the present disclosure, at the start of a data transfer, communicate the current buffer in the destination clock domain DCD to the source clock domain SCD to thereby set the current buffer in the source clock domain to be equal to that in the destination clock domain. Thereafter, when a read or write data transfer request signal is communicated from the source clock domain SCD to the destination clock domain DCD, the synchronization circuit detects whether the communicated data transfer request signal is associated with the current buffer in the destination clock domain. If the data transfer request signal is associated with the current buffer, then the data transfer is performed in the current data transfer cycle. When the data transfer request signal is not associated with the current buffer in the destination clock domain, the data transfer request signal for the associated data buffer B0, B1 is delayed until a subsequent data transfer cycle, and the data transfer associated performed during this subsequent data transfer cycle.

Figure 3:
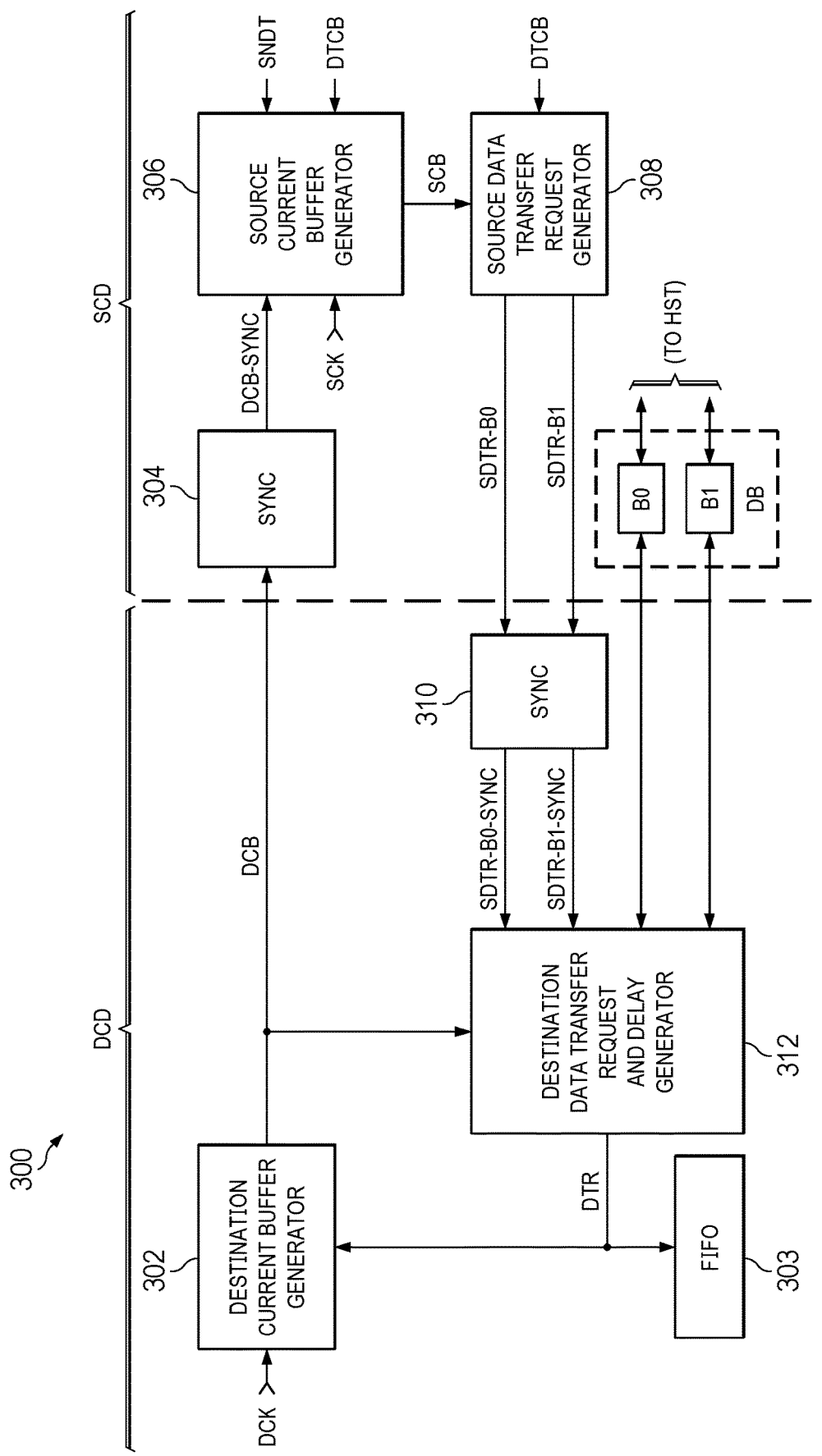
FIG. 3 is a functional block diagram of a clock domain crossing synchronization circuit according to an embodiment of the present disclosure.
Figure 4A:
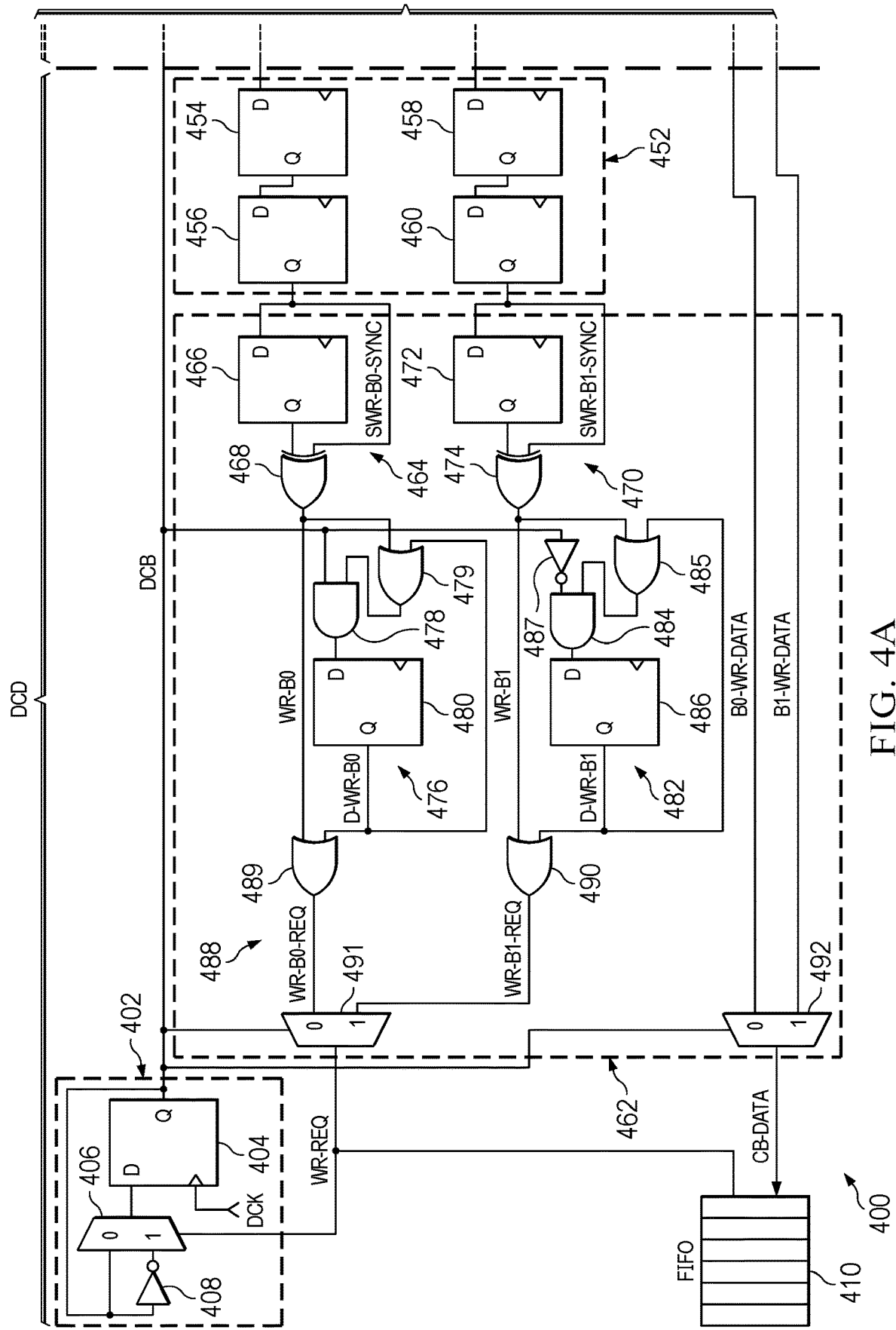
FIGS. 4A and 4B are a more detailed functional block diagram of a write clock domain crossing synchronization circuit according to an embodiment of the present disclosure.
Figure 4B:
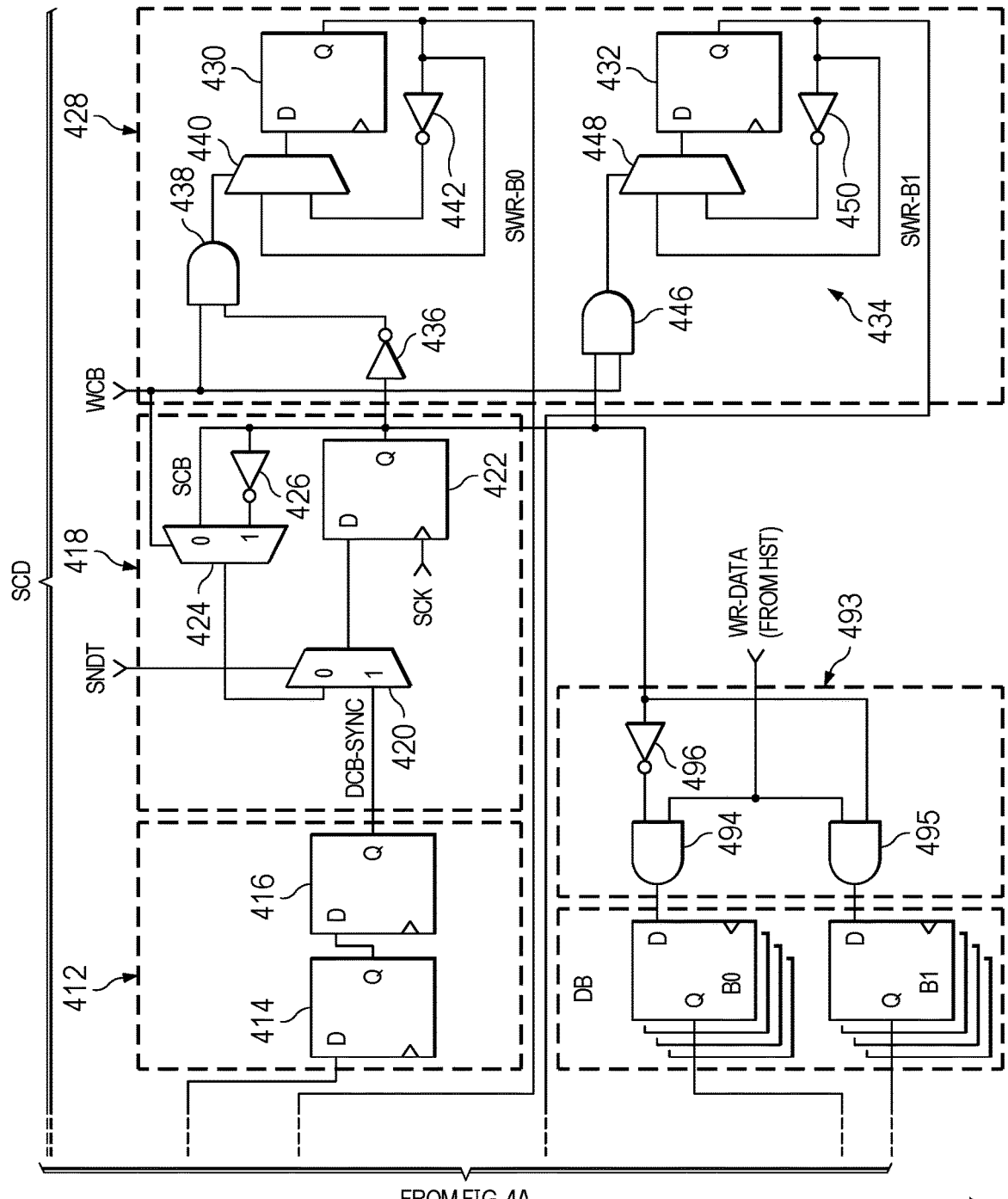

FIG. 3 is a functional block diagram of a clock domain crossing synchronization circuit 300 according to an embodiment of the present disclosure. Portions of the synchronization circuit 300 would be contained in the RX submodule 108, TX submodule 110, FIFO write controller 112, and FIFO read controller 114 in the electronic system 100 in some embodiments of the present disclosure. The synchronization circuit 300 includes a destination current buffer generator 302 in a destination clock domain DCD. The destination current buffer generator 302 is configured to generate a destination domain current buffer signal DCB having a value indicating whether a first data buffer B0 or a second data buffer B1 of a double buffer DB in a source clock domain SCD is a current buffer to be utilized in a current data transfer cycle or operation. The destination current buffer generator 302 also toggles, or changes a level or state, of the DCB signal in response a data transfer request signal DTR that is applied to a FIFO memory 303 during a data transfer cycle of the synchronization circuit 300, as will be described in more detail below. Components of the synchronization circuit 300 in the destination clock domain DCD are clocked by a destination domain clock signal DCK and components in the source clock domain SCD clocked by a source domain clock signal SCK. The clock signals DCK, SCK are shown as being applied to only selected components in the synchronization circuit of FIG. 3 merely to simplify the figure.

A first synchronization circuit 304 receives the destination current buffer signal DCB and generates a corresponding synchronized destination current buffer signal DCB-SYNC in the source clock domain. The DCB-SYNC signal is applied to a source current buffer generator 306, which is configured to generate a source domain current buffer signal SCB based on the synchronized destination current buffer signal DCB-SYNC. The source current buffer signal SCB has a first value indicating the first data buffer B0 is the current buffer and a second value indicating the second data buffer B1 is the current buffer. The source current buffer generator 306 further receives the start new data transfer signal SNDT supplied by the additional electronic circuitry 16 contained in the SDIO slave IP core 12 of the SDIO card 14 containing the electronic system 100, as previously described above with reference to FIG. 1A. In response to the SNDT signal going active to indicate the start of new data transfer cycle or operation of the synchronization circuit 300, the source current buffer generator 306 sets the source current buffer signal SCB to a value corresponding to the same current buffer indicated by the synchronized destination current buffer signal SCD-SYNC. In this way, at the start of a data transfer operation, the SCB signal is set to indicate the same current buffer as the DCB signal so that the circuitry in both clock domains DCD and SCD are starting with the same current buffer, either data buffer B0 or data buffer B1.

After the start of a data transfer operation, the source current buffer generator 306 changes or toggles the value of the source current buffer signal SCB each data transfer cycle of the data transfer operation in response to the data transfer current buffer signal DTCB indicating the other data buffer B0, B1 should be utilized. Referring back to FIG. 1A, each of the RX submodule 108 and TX submodule 110 utilizes the DTCB signal to switch between the two data buffers B0, B1. The additional electronic circuitry 16 activates the DTCB, causing the corresponding submodule 108, 110 to switch the current buffer B0, B1, either when the current buffer is full (i.e., all of the corresponding data is stored in the current buffer), or if the last byte of the data being transferred to the current buffer has been received or sent. The DTCB signal includes a write current buffer signal WCB and read current buffer signal RCB that are utilized by write clock domain crossing synchronization circuitry and read clock domain crossing synchronization circuitry, respectively, as will be discussed in more detail below with reference to FIGS. 4A, 4B and 7A, 7B.

The value of SCB signal toggles between the first and second values to alternately indicate the first data buffer B0 or second data buffer B1 is the current buffer. The current buffer signal SCB accordingly alternately changes each data transfer cycle of a data transfer operation. A source data transfer request generator 308 receives the source current buffer signal SCB and generates a source data transfer request signal SDTR in the source clock domain SCD based on the source current buffer signal. The source data transfer request signal SDTR is associated with the current buffer indicated by the source current buffer signal SCB. In the embodiment of FIG. 3, the source data transfer request signal SDTR includes a first buffer source data transfer request signal SDTR-B0 and a second buffer source data transfer request signal SDTR-B1. When the first buffer B0 is the current buffer, the source data transfer request generator 308 activates the SDTR-B0 signal, and when the second buffer B1 is the current buffer the source data transfer request generator activates the SDTR-B1 signal. Only one of the source data transfer request signals SDTR-B0, SDTR-B1 is activated at a time in the source clock domain SCD.

A second synchronization circuit 310 receives the source data transfer request signals SDTR-B0, SDTR-B1 and generates a corresponding synchronized source data transfer request signal in the destination clock domain. In the example embodiment of FIG. 3, the synchronized source data transfer request signal includes a first buffer synchronized source data transfer request signal SDTR-B0-SYNC and a second buffer synchronized source data transfer request signal SDTR-B1-SYNC in the destination clock domain. Although only one of the source data transfer request signals SDTR-B0, SDTR-B1 is activated at a time in the source clock domain SCD, both the SDTR-B0-SYNC, SDTR-B1-SYNC signals could be activated or switch at the same time in the destination clock domain DCD due to the proper ordering of these signals not being guaranteed by the synchronization circuit 310.

A destination data transfer request and delay generator 312 in the destination clock domain receives the synchronized source data transfer request signals SDTR-B0-SYNC, SDTR-B1-SYNC and the destination domain current buffer signal DCB. In operation, the destination data transfer request and delay generator 312 utilizes the DCB signal to determine which one the synchronized source data transfer request signals SDTR-B0-SYNC, SDTR-B1-SYNC to utilize during a current data transfer cycle and which one of these signals to delay to a subsequent data transfer cycle. The delay data transfer request and delay generator 312 delays the transfer of data between the FIFO memory 303, or other type of memory in other embodiments, and the one of the data buffers B0, B1 that is the current buffer to a subsequent data transfer cycle when the current buffer indicated by or associated with the destination domain data transfer request signal SDTR-B0-SYNC, SDTR-B1-SYNC does not correspond to the current buffer indicated by the destination domain current buffer signal DCB. When the destination domain current buffer signal DCB has a value indicating the same current buffer as associated with the activated SDTR-B0-SYNC, SDTR-B1-SYNC signal, the destination data transfer request and delay generator 312 provides the data transfer request signal DTR to the FIFO memory 303 to thereby transfer data between the FIFO memory and the current buffer in the current data transfer cycle.

In operation of the synchronization circuit 300, a data transfer operation starts in response to the additional electronic circuitry 16 of the SDIO slave IP core 12 (see FIG. 1A) activating the start new data transfer signal SNDT applied to the source current buffer generator 306. Each data transfer operation includes one or more data transfer cycles. In response to the SNDT signal going active, the source current buffer generator 306 drives the source current buffer signal SCB to the same level or value to indicate the same current buffer as the synchronized destination current buffer signal DCB-SYNC provided by the first synchronization circuit 304. The DCB-SYNC signal indicates the current value of the destination current buffer signal DCB generated by the destination current buffer generator 302 and thereby the current buffer in the destination clock domain. In this way, the components in the source clock domain SCD determine the current buffer to be used to start the data transfer operation.

The source data transfer request generator 308 thereafter activates the one of the first buffer source data transfer request signal SDTR-B0 and second buffer source data transfer request signal SDTR-B1 that corresponds to the current buffer. Assume for the present example data operation being described, the initial current buffer is data buffer B0 so that the request generator 308 actives the SDTR-B0 signal. The synchronization circuit 310 then resynchronizes the SDTR-BO signal to activate the synchronized source data transfer request signal SDTR-B0-SYNC in the destination clock domain DCD. At this point, the destination data transfer request and delay generator 312 takes one of two actions depending on whether the current buffer, which is buffer B0 in the present example, corresponds to the current buffer indicated by the destination domain current buffer signal DCB. When the DCB signal indicates the current buffer is buffer B0, the destination data transfer request and delay generator 312 activates the data transfer signal DTR supplied to the FIFO memory 303 to thereby transfer data between the current buffer B0 and the FIFO memory 303 in the current data transfer cycle. In response to the activated DTR signal, the destination current buffer generator 302 increments or toggles the DCB signal to indicate the other data buffer B1 it the current buffer during a subsequent data transfer cycle. In the source clock domain SCD, the source current buffer generator 306 also increments or toggles the SCB signal in response to the additional electronic circuitry 16 in the SDIO slave IP core 12 (FIG. 1A) driving the DTCB signal to indicate either the current data buffer B0, B1 is full (i.e., all of the corresponding data is stored in the current buffer) or the last byte of the data being transferred to the current buffer has been received or sent.

During a data transfer cycle, it is possible that the value of the DCB signal has changed state by the time the SDTR-B0 signal is applied to the destination data transfer request and delay generator 312. Thus, if in the present example the DCB signal indicates the current buffer is buffer B1 and not buffer B0, the destination data transfer request and delay generator 312 delays the transfer of data between the current buffer B0 and the FIFO memory 303 until a subsequent data transfer cycle. In this situation, data is first transferred between the buffer B1 and the FIFO memory 303 during the current data transfer cycle. As soon as the destination current buffer signal DCB changes state responsive to the activated DTR signal for this transfer, the DCB signal will once again indicate the buffer B0 is the current buffer and at this point the destination data transfer request and delay generator 312 immediately activates the DTR signal to transfer data between the FIFO memory 303 and the buffer B0. In this way, no data transfers between the clock domains are lost, but transfers may merely be delayed until a subsequent data transfer cycle where the current buffer associated with a transfer does not match between the source and destination clock domains SCD, DCD.

FIG. 4 is a more detailed functional block diagram of a write clock domain crossing synchronization circuit 400 according to an embodiment of the present disclosure. The clock domain crossing synchronization circuit 300 of FIG. 3 includes the write clock domain crossing synchronization circuit 400 of FIG. 4 as well as a read clock domain crossing synchronization circuit 700 as shown in FIG. 7 to provide synchronization for both read and write data transfers between the source clock domain SCD and destination clock domain DCD.

Referring to FIG. 4, the write clock domain crossing synchronization circuit 400 includes a destination current buffer generator 402 to generate the destination current buffer signal DCB. The generator 402 includes a flip-flop 404 having an input and an output and is clocked by a destination domain clock signal DCK. A multiplexer 406 having a first input coupled to the output of the flip-flop, a second input receiving the output of the flip-flop through an inverter 408, an output coupled to the input of the flip-flop. A control input of the multiplexer 406 is coupled to receive a write request signal WR-REQ, where the write request signal is part of the data transfer request signal DTR discussed above with reference the synchronization circuit 300 of FIG. 3.

In operation, the destination current buffer generator 402 toggles the DCB signal each time the WR-REQ signal goes active to transfer data into a FIFO memory 410. The FIFO memory 410 corresponds to the FIFO memory in the destination clock domain DCD as discussed above with reference to the embodiments of FIGS. 1 and 3. When the WR-REQ signal is asserted or activated, the multiplexer 406 supplies the complement of the DCB signal from the inverter 408 to the input of the flip-flop 404 so that when the flip-flop is clocked complement of the current value of the DCB signal is output by the flip-flop. In this way the generator 402 toggles the DCB signal responsive to the WR-REQ signal being activated. When the WR-REG signal is not active, the multiplexer 408 outputs the feedback DCB signal to the input of the flip-flop 404 so that the current value of the DCB signal is maintained whenever the flip-flop is clocked.

The write clock domain crossing synchronization circuit 400 further includes a first synchronization circuit 412 including first and second series-connected flip-flops 414 and 416 that are clocked by a source domain clock signal SCK. The series-connected flip-flops 414, 416 function in a conventional manner to synchronize the DCB signal in the source clock domain SCD and provide a synchronized DCB signal SCB-SYNC. A source domain current buffer generator 418 includes a first multiplexer 420 having a first input coupled to receive the SCB-SYNC signal and a control input coupled to receive the start new data transfer signal SNDT provided by additional electronic circuitry 16, as described above in relation to FIGS. 1A and 3. A flip-flop 422 has an input coupled to the output of the first multiplexer 420 and has an output on which a source domain current buffer signal SCB is provided. A second multiplexer 424 receives the SCB signal on a first input and the complement of the SCB signal on a second input in the form of the SCB signal applied through an inverter 426. An output of the second multiplexer 424 is coupled to a second input of the first multiplexer 420. A control input of the second multiplexer 424 is coupled to receive the write current buffer signal WCB provided by the additional electronic circuitry 16 where the WCB signal is one of the signals corresponding to the DTCB signal discussed above with reference to FIGS. 1A and 3.

In operation of the source domain current buffer generator 418, at the start of a data transfer operation the additional electronic circuitry 16 contained in the SDIO slave IP core 12 of the SDIO card 14 (FIG. 1A) asserts or activates the SNDT signal and deactivates the WCB signal. The activated SNDT signal causes the multiplexer 420 to provide the DCB-SYNC signal to the input of the flip-flop 422. The flip-flop 422 is then clocked by the SCK signal to output the SCB signal having a value corresponding to the value of the DCB-SYNC signal. After a sufficient time for the value of the DCB-SYNC signal to be clocked into the flip-flop 422, the additional electronic circuitry 16 deactivates the SNDT signal, which causes the multiplexer to provide the output of the multiplexer 424 to the input of the flip-flop 422. When the WCB signal is deactivated, the multiplexer 424 provides the SCB signal on its so that the current value of the SCB signal if fed back through the multiplexers 424 and 420 to the input of flip-flop 422 to maintain the current value of the SCB signal when the flip-flop is clocked. When the WCB signal is activated, the multiplexer 424 provides the complement of the SCB signal from the invert 426 on its output and this complement is thereafter supplied through the multiplexer 420 to the input of flip-flop 422. In this situation, when the flip-flop 422 is clocked the flip-flop toggles or drives to the complementary state the SCB signal. The additional electronic circuitry 16 activates the WCB signal whenever write data has been loaded into the current buffer and is ready for transfer to the FIFO memory 410, as will be described in more detail below.

The clock domain crossing synchronization circuit 400 further includes a source data transfer request generator 428 that generates a source data transfer request signal in the form of a first buffer source write request signal SWR-B0 and a second buffer source write request signal SWR-B1. In embodiments of the circuit 400, each of the SWR-B0, SWR-B1 signals may be an NRZ signal, and in the present description such an NRZ signal may be described as "going active" or being an "active signal." In this context, "going active" or "active signal" corresponds to a transition or edge of such an NRZ signal. The source data transfer request generator 428 includes a first flip-flop 430 and second flip-flop 432 that generate the SWR-B0 and SWR-B1 signals on respective outputs. The source data transfer request generator 428 further includes logic circuitry 434 that receives the WCB signal and the SCB signal and is coupled to the inputs of the flip-flops 430, 432. The logic circuitry 434 is configured to provide an active signal to an input of the first flip-flop 430 in response to WCB signal going active and the SCB signal indicating a first data buffer B0 is the current buffer. The logic circuitry 434 is further configured to provide an active signal to an input of the second flip-flop 432 in response to WCB signal going active and the SCB signal indicating the second data buffer B1 is the current buffer. Finally, the logic circuitry 434 is further configured to provide an inactive signal on the input of each of the first and second flip-flop 430, 432 in response to the first buffer source write request signal SWR-B0 and second buffer source write request signal SWR-B1 going active, respectively.

In the embodiment of FIG. 4, the logic circuitry 434 includes an inverter 436 having an input coupled to receive the SCB signal and having an output coupled to a first input a first AND gate 438. The first AND gate 438 has a second input that receives the WCB signal and has an output coupled to a first input of a multiplexer 440. The output of the multiplexer 440 is applied to the input of flip-flop 430 and output of this flip-flop is coupled directly and through an inverter 442 to a first and a second input, respectively, of the multiplexer. The logic circuitry 434 further includes a second AND gate 446, multiplexer 448, and inverter 450 coupled to the flip-flop 432 in the same was as just described for the components 438, 440, 442 for the flip-flop 430. In contrast to the first AND gate 438, however, the second AND gate 446 receives the SCB signal directly on an input.

In operation, the source data transfer request generator 428 activates the one of the SWR-B0, SWR-B1 signals corresponding to the current buffer indicated by the SCB signal whenever the additional electronic circuitry 16 activates the WCB signal. As mentioned above, the WCB signal is activated in relation to write data WR-DATA being stored in the current buffer B0 or B1 and being ready for transfer to the FIFO memory 410. Initially, assume the SCB signal is high indicating the buffer B1 is the current buffer and the WCB signal is inactive low. The high SCB signal enables the AND gate 446, but this AND gate initially provides a low output to the multiplexer 448 due to the low WCB signal. The low output from AND age 446 causes the multiplexer 448 to provide the SWR-B1 signal at the output of the flip-flop 432 to the input of this flip-flop. In this situation, the flip-flop 432 maintains the current state of the SWR-B1 signal if clocked by source clock domain signal SCD. When the WCB signal is activated (i.e., driven high in this embodiment), the AND gate 446 applies a high output to multiplexer 448 which, in turn, couples the complement of the output of flip-flop 432 to the input of the flip-flop 432, where the complement of the output of flip-flop 432 is the complement of the SWR-B1 signal output by the inverter 450.

When the flip-flop 432 is thereafter clocked by the source domain clock signal SCK, the flip-flop drives the SWR-B1 signal active, assuming both the SCB and WCB signals are a logic 1. Whenever both the SCB and WCB signals are a logic 1, the SWR-B1 signal provided by the flip-flop 432 changes value when clocked by the SCK signal. In this way, SWR-B1 signal maintains its current value (logic 1 or 0) until the next switch to the current buffer B1. The activated SWR-B1 signal is a non-return to zero (NRZ) signal in the embodiment of FIG. 4. When the flip-flop 432 drives the SWR-B1 signal active, this active signal is fed back through inverter 450 to provide the complement of the SWR-B1 signal to the corresponding input of the multiplexer 448 which, in turn, provides this complement to the input of the flip-flop 432. As a result, when the flip-flop 432 is again clocked by the SCK signal, the selection signal supplied to the multiplexer 448 from AND gate 446 is a logic 0, causing the flip-flip to maintain the value of the SWR-B1 signal when the flip-flop is next clocked by the SCK signal. In this way the flip-flop 432 generates an active NRZ signal for the SWR-B1 signal. The components 436, 438, 440 and 442 coupled to flip-flop 430 operate in the same way to cause this flip-flop to generate an active NRZ signal for the SWR-B0 signal when the SCB signal is low, indicating the current buffer is the buffer B0.

The clock domain crossing synchronization circuit 400 of FIG. 4 further includes a second synchronization circuit 452 including two pairs of series-connected flop-flops. More specifically, the synchronization circuit 452 includes first and second series-connected flip-flops 454, 456 that are clocked by the destination domain clock signal DCK. These series-connected flip-flops 414, 416 function in a conventional manner to synchronize the SWR-B0 signal in the destination clock domain DCD and provide a synchronized first buffer source write request signal SWR-B0-SYNC. The synchronization circuit 452 further includes series-connected flip-flops 458, 460 that are clocked by the DCK signal and function to synchronize the SWR-B1 signal in the destination clock domain to provide a synchronized second buffer source write request signal SWR-B1-SYNC.

In the embodiment of FIG. 4, the clock domain crossing synchronization circuit 400 further includes a destination data transfer request and delay generator 462 that receives the SWR-B0-SYNC and SWR-B1-SYNC signals from the second synchronization circuit 452. The SWR-B0-SYNC and SWR-B1-SYNC are part of the SDTR-B0-SYNC and SDTR-B1-SYNC signals in the embodiment of FIG. 3, and may also be referred to as write first buffer signal SWR-B0-SYNC and write second buffer signal SWR-B1-SYNC in the present description. The destination data transfer request and delay generator 462 includes a first pulse generator 464 including a flip-flop 466 that receives the SWR-B0-SYNC signal on an input and has an output coupled to one input of an XOR gate 468. A second input of the XOR gate 468 is coupled to receive the SWR-B0-SYNC signal directly and the XOR gate generates a write first buffer pulse signal WR-B0 on an output. A second pulse generator 470 includes a flip-flop 472 that receives the SWR-B1-SYNC signal on an input and has an output coupled to one input of an XOR gate 474. A second input of the XOR gate 474 is coupled to receive the SWR-B1-SYNC signal directly and the XOR gate generates a write second buffer pulse signal WR-B0 on an output.

In operation, each pulse generator 464, 470 generates an active pulse signal for the WR-B0, WR-B1 signal in response to corresponding SWR-B0-SYNC, SWR-B1-SYNC signal going active. For example, assume the output of flip-flop 466 is initially low along with the SWR-B0-SYNC signal. At this point, the XOR gate 468 drives the WR-B0 signal inactive low. In response to the SWR-B0-SYNC signal going active high, the XOR gate 468 drives the WR-B0 signal active high since the XOR gate now receives the high SWR-B0-SYNC signal and the low output signal from the flip-flop 466. When the flip-flip 466 is next clocked by the DCK signal, the flip-flop drives its output high so that the XOR gate 468 then deactivates the WR-B0 signal. In this way the pulse generator 464 generates a pulse signal for WR-B0 signal. The operation of pulse generator 470 is the same in relation to generation of a pulse signal for the WR-B1 signal.

The destination data transfer request and delay generator 462 further includes a first transfer request delay circuit 476 having a first input coupled to receive the destination domain current buffer signal DCB and a second input coupled to receive the write first buffer pulse signal WR-B0. The first transfer request delay circuit 476 is configured to drive a delayed write first buffer signal D-WR-B0 active in response to the write first buffer pulse signal WR-BO going active and the destination domain current buffer signal DCB indicating the second buffer B1 is the current buffer in the destination clock domain DCD. In the embodiment of FIG. 4, the first transfer request delay circuit 476 includes an AND gate 478 having a first input coupled to receive the DCB signal and a second input coupled to an output of an OR gate 479 receiving the WR-BO signal on a first input and the D-WR-B0 signal on a second input. An output of the AND gate 478 is supplied to an input of a flip-flop 480 that generates the D-WR-B0 signal on an output.

In operation, when either the WR-B0 signal or D-WR-B0 signal is active high, the OR gate 479 enables AND gate 478. When AND gate 478 is enabled and the DCB signal is high, indicating the current buffer is buffer B1, and the WR-B0 signal is active indicating the buffer B0 is to be written to, the AND gate 478 drives its output high. When the flip-flop 480 is clocked, this high output of the AND gate 478 is latched by the flip-flop, driving the D-WR-B0 signal active high. The D-WR-B0 signal will thereafter be utilized to write data associated with the WR-B0 signal during a subsequent data transfer cycle, as will be described in more detail below. The OR gate 479 functions to cause the flip-flop 480, when clocked, to maintain the D-WR-B0 signal high (i.e., a logic 1) when the DCB signal is high indicating the current buffer is buffer B1 and not buffer B0.

A second transfer request delay circuit 482 includes an AND gate 484, OR gate 485, and flip-flop 486 coupled in the same way as in the corresponding components 478, 479, 480 in the first transfer request delay circuit 476, except the DCB signal is applied through an inverter 487 to one input of the AND gate 484. The second transfer request delay circuit 482 operates in the same way as described for the first transfer request delay circuit 476 except in relation to the buffer B1. When the DCB signal is low, indicating the current buffer is buffer B0, and the WR-B1 signal goes high indicating the buffer B1 is to be written to, the AND gate 484 drives its output high. When the flip-flop 486 is clocked this high output of the AND gate 484 is latched by the flip-flop, driving the D-WR-B1 signal high. The D-WR-B1 signal will thereafter be utilized to write data associated with the WR-B1 signal during a subsequent data transfer cycle, as will be also described in more detail below. The OR gate 485 functions to cause the flip-flop 486, when clocked, to maintain the D-WR-B1 signal high (i.e., a logic 1) when the DCB signal is low indicating the current buffer is buffer B0 and not buffer B1.

The destination data transfer request and delay generator 462 further includes output logic 488 coupled to the first and second pulse generators 464, 470 to receive the write first buffer pulse signal WR-B0 and write second buffer pulse signal WR-B1. The output logic 488 is further coupled to the first and second transfer request delay circuits 476, 482 to receive the delayed write first buffer signal D-WR-B0 and delayed write second buffer signal D-WR-B1. The output logic 488 generates a first buffer write request pulse signal WR-B0-REQ in response to either the WR-B0 or D-WR-B0 signal going active. The output logic 488 generates a second buffer write request pulse signal WR-B1-REQ in response to either the WR-B1 or D-WR-B1 signal going active. In the embodiment of FIG. 4, the output logic 488 includes a first OR gate 489 receiving the WR-B0 and D-WR-B0 signals and generating the WR-B0-REQ in response to these signals. A second OR gate 490 receives the WR-B1 and D-WR-B1 signals and generating the WR-B1-REQ in response to these signals.

The destination data transfer request and delay generator 462 further includes a first selection circuit in the form of a multiplexer 491 in the embodiment of FIG. 4. The multiplexer 491 has inputs coupled to the output logic 488, or more specifically the outputs of OR gates 489, 490 to receive the WR-B0-REQ and WR-B1-REQ signals. A control input of the multiplexer 491 receives the destination domain current buffer signal DCB. When DCB signal is low indicating the first buffer B0 is the current buffer, the multiplexer 491 outputs the WR-B0-REQ signal as a write request signal WR-REQ to the FIFO memory 410 to transfer write data from the current buffer (buffer B0) as indicated by the DCB signal to the FIFO memory. When the DCB signal is high indicating the second buffer B1 is the current buffer, the multiplexer 491 provides the WR-B1-REQ signal as the write request signal WR-REQ to the FIFO memory 410 to transfer write data from the current buffer (buffer B1) as indicated by the DCB signal to the FIFO memory.

In addition to the above operation, the destination data transfer request and delay generator 462 also operates to ensure that desired write data transfers (i.e., WR-B0 and WR-B1) are not dropped or missed. The destination data transfer request and delay generator 462 does this by generating the WR-REQ signal to transfer write data to the FIFO memory 410 in situations where the current buffer as indicated by the DCB signal does not correspond to the buffer associated with activated WR-B0 or WR-B1 signal. This is accomplished through the delayed write first and second buffer signals D-WR-B0, D-WR-B1 generated by the circuit 462. The D-WR-B0 signal is set to active when a WR-B0 signal has been generated to transfer write data from buffer B0 to the FIFO memory 410, but the DCB signal indicates the current buffer is buffer B1. In this situation, as soon as the DCB signal transitions to indicate the current buffer is buffer B0, the active D-WR-B0 signal causes OR gate 489 to activate the WR-B0-REQ signal which, in turn, is provided through multiplexer 491 as the WR-REQ signal to FIFO memory 410 to thereby write data from the buffer B0 into the FIFO memory. Thus, even though the DCB signal indicates a different current buffer than the buffer associated with the write request signal (WR-B0 or WR-B1) coming from the source clock domain SCD, this write request is not lost but instead is delayed until a subsequent data transfer cycle in which the DCB signal corresponds to the current buffer associated with this write request. The operation of the destination data transfer request and delay generator 462 operates in an analogous way with regard to the D-WR-B1 and the WR-B1 signals in relation to the buffer B1.

Finally, the destination data transfer request and delay generator 462 includes a selection circuit 492, which is a multiplexer in the embodiment of FIG. 4. The multiplexer has a first input coupled to receive first buffer write data B0-WR-DATA from the data buffer B0 and a second input coupled to receive second buffer write data B1-WR-DATA from the data buffer B1. The data buffers B0 and B1 are part of a double buffer DB in the source clock domain SCD, as described above with reference to the embodiment of FIG. 3. In operation, the multiplexer 492 supplies the write data B0-WR-DATA stored in data buffer B0 to the FIFO memory 410 when the DCB signal indicates the first data buffer B0 is the current buffer. When the DCB signal indicates that the second data buffer B1 is the current buffer, the multiplexer 492 supplies the write data B1-WR-DATA stored in data buffer B1 to the FIFO memory 410.

Finally, in the embodiment of FIG. 4 the clock domain crossing synchronization circuit 400 further includes a data selection circuit 493 coupled to the data buffers B0, B1 of the double buffer DB and further coupled receive write data WR-DATA from the host HST. In response to the SCB signal, the data selection circuit 493 supplies the write data WR-DATA from the host HST to the first data buffer B0 for storage when the DCB signal indicates the first data buffer B0 is the current buffer. When the DCB signal indicates the second data buffer B1 is the current buffer, the data selection circuit 493 supplies the write data WR-DATA from the host HST to the second data buffer B1 for storage.

The data selection circuit 493 includes a first AND gate 494 having a first input coupled to receive the WR-DATA from the host HST, and a second input coupled to receive the SCB signal applied through an inverter 496. A second AND gate has a first input coupled to receive the WR-DATA from the host HST and a second input coupled to receive the SCB signal. When the SCB signal is low, indicating the data buffer B0 is the current buffer, the low SCB signal is applied through inverter 492 to enable AND gate 494 and thereby provide WR-DATA from the host HST to the first data buffer B0 for stored in the first data buffer. Conversely, when the SCB signal is high, indicating the data buffer B1 is the current buffer, the high SCB signal enables AND gate 495 to thereby provide WR-DATA from the host HST to the second data buffer B1 for stored in the second data buffer. The write data WR-DATA includes a plurality of signals or bit, although not expressly shown in FIG. 4. Thus, although only two single AND gates 494 and 495 are shown, a bank of such AND gates would actually be included in the data selection circuit 492, one AND gate for each bit of the WR-DATA. This is more clearly illustrated for the depiction of the data buffers B0, B1 in FIG. 4, where each buffer is shown to include a plurality of flip-flops, one flip-flop for each bit of the WR-DATA to be stored in the buffer.

Figure 5:
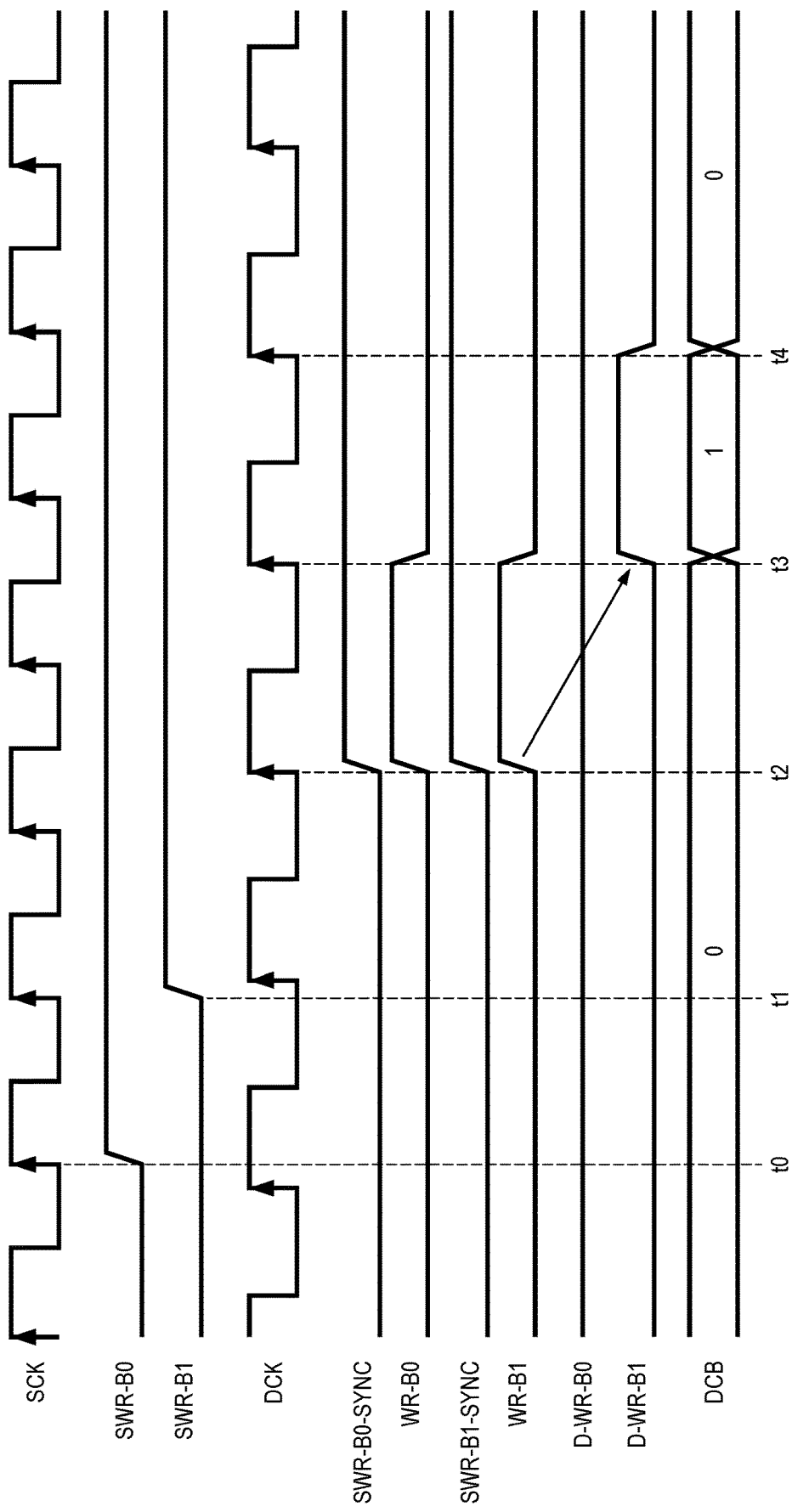
FIG. 5 is a signal timing diagram illustrating operation of the write clock domain crossing synchronization circuit of FIG. 4 in a first example of delaying a write data transfer.

FIG. 5 is a signal timing diagram illustrating the operation of the write clock domain crossing synchronization circuit 400 of FIG. 4. The signal timing diagram illustrates, more specifically, the operation of the destination data transfer request and delay generator 462 in delaying a write data transfer from the source clock domain SCD when the data buffer B0, B1 associated with the request does not correspond to the current buffer indicated in the destination clock domain DCD. FIG. 5 illustrates an example in which the write data from the first data buffer B0 is written first and thereafter write data from the data buffer B1 is written using the D-WR-B1 signal generated for this write transfer. The operation will now be described with reference to FIGS. 4 and 5.

At a time t0, the source data transfer request generator 428 generates the first buffer source write request signal SWR-B0 associated with a write data transfer to be performed with the data buffer B0 as the current buffer. At a later time t1, the source data transfer request generator 428 generates the second buffer source write request signal SWR-B1 associated with a write data transfer to be performed with the data buffer B1 as the current buffer. At a time t2, corresponding signals generated in the destination clock domain DCD based on the SWR-B0 and SWR-B1 signals from the source clock domain SCD are shown. More specifically, the SWR-B0-SYNC and SWR-B1-SYNC signals from the synchronization circuit 452, along with the write first and second buffer pulse signals WR-B0, WR-B1 from the destination data transfer request and delay generator 462, are shown as transitioning in the destination clock domain DCD. The proper order has been lost with these signals, with the transitions for all the signals occurring at approximately t2. Thus, although edges or transitions of the SWR-B0 and SWR-B1 signals are spaced apart at times t0 and t1 in the source clock domain SCD, the corresponding transitions occur at substantially the same time t2 in the destination clock domain.

In a conventional synchronization circuit, the loss of proper ordering and occurrence of multiple transitions at time t2 may result in improper operation, such as loss of one of the write transfers issued from the source clock domain SCD in the form of the SWR-B0 and SWR-B1 signals. In the example of FIG. 5, the write data transfer associated with the SWR-B0 signal is processed first in the destination clock domain DCD to transfer write data from the data buffer B0 to the FIFO memory 410. This is seen in the signal timing diagram as the write first buffer pulse signal WR-B0 is asserted from time t2 to time t3. This signal is associated with or corresponds to a write transfer with first data buffer B0, and during this time the DCB signal indicates the first data buffer B0 is the current buffer. Thus, this write transfer associated with buffer B0 is processed first. In addition, the transition of the WR-B1 signal while the DCB signal indicates the current buffer is data buffer B0 results in generation of the active delayed write second buffer signal D-WR-B1 at time t3. As a result, when the value of the DCB signal changes state at time t3 to indicate the current buffer is data buffer B1, the write transfer associated with the SWR-B1 signal is performed. Thus, both the write transfers associated with the SWR-B0 and SWR-B1 signals are performed notwithstanding the loss synchronization of the associated signals in the destination clock domain DCD.

Figure 6:
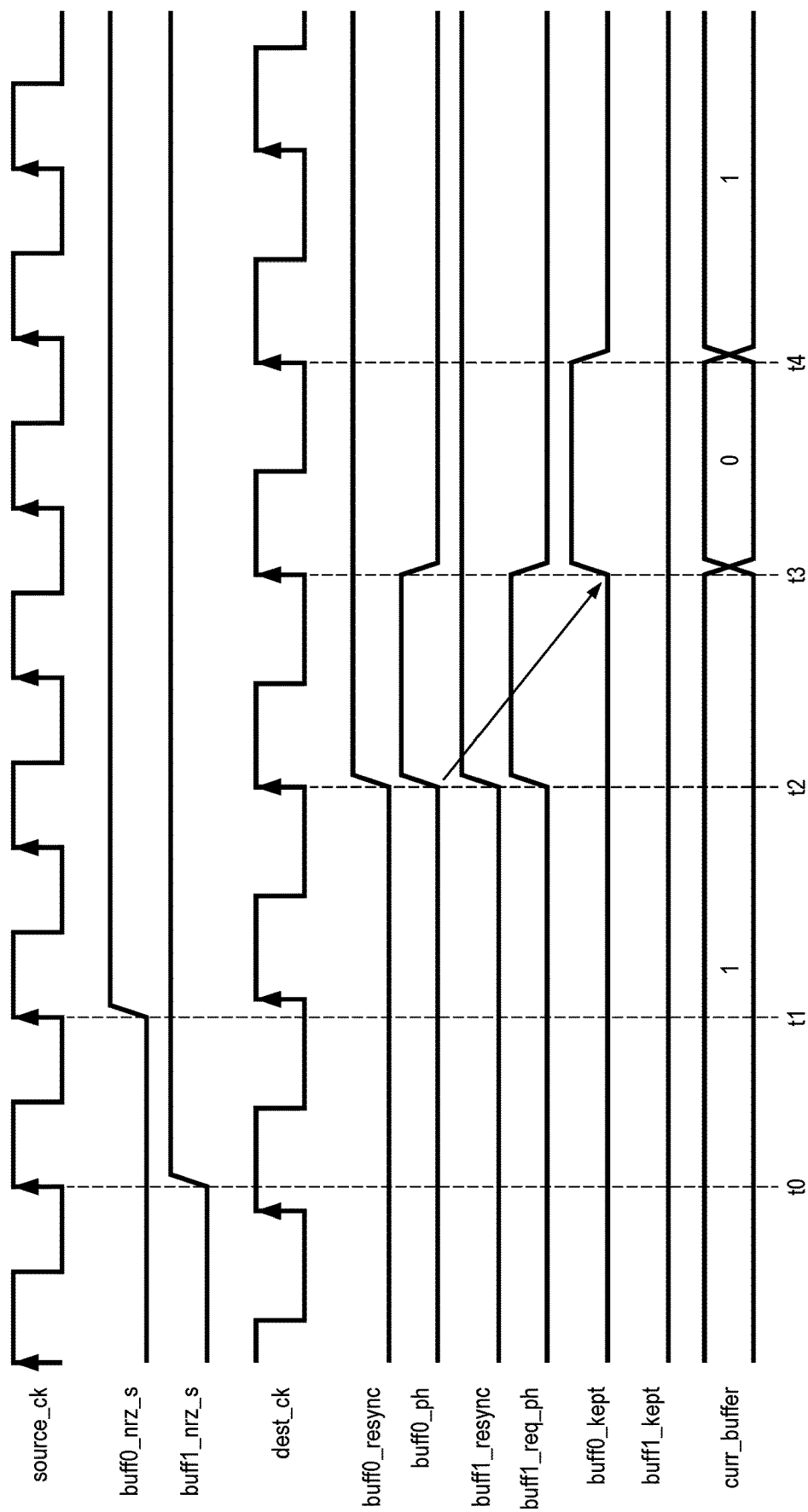
FIG. 6 is a signal timing diagram illustrating operation of the write clock domain crossing synchronization circuit of FIG. 4 in a second example of delaying a write data transfer.
Figure 7A:
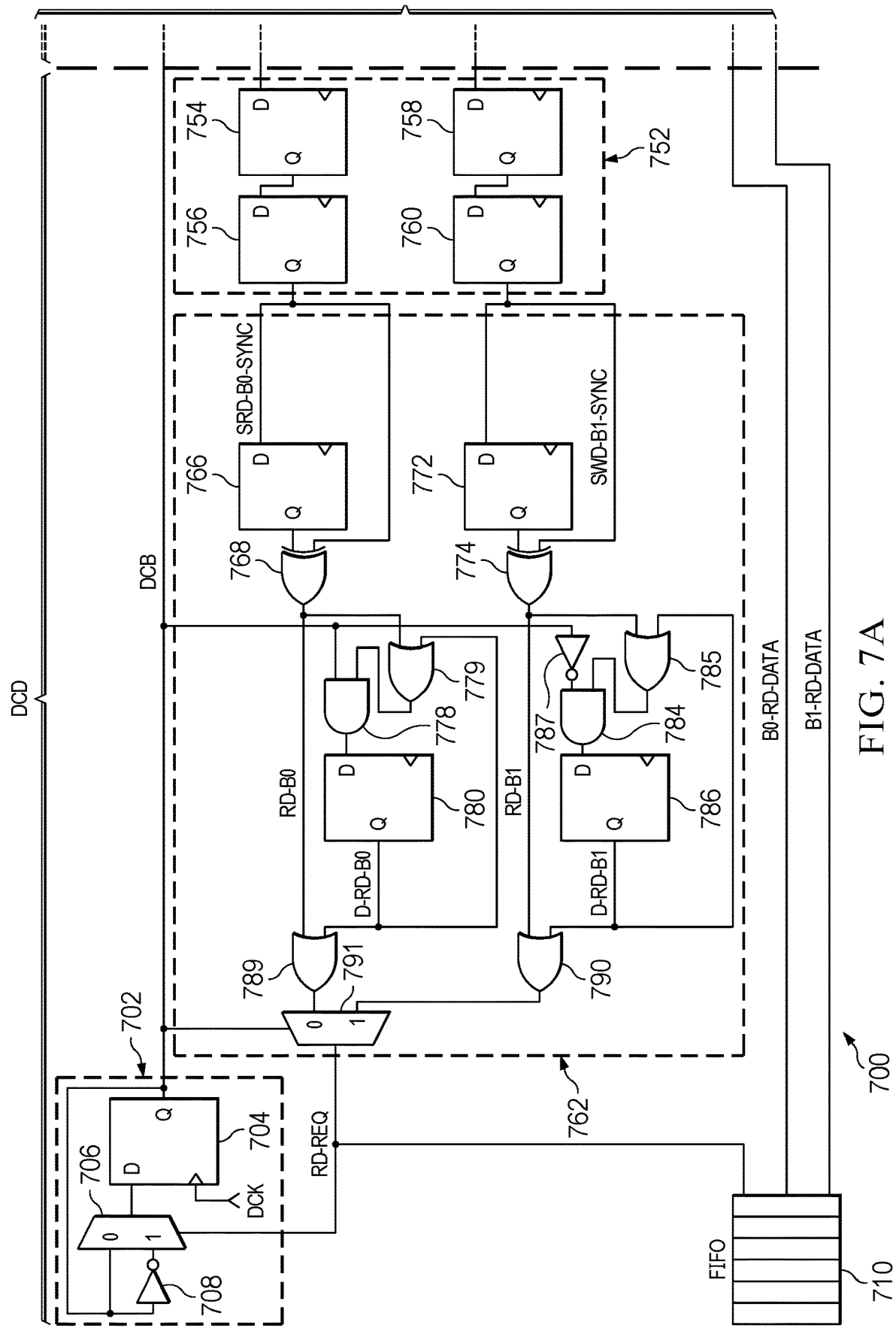
FIGS. 7A and 7B are a more detailed functional block diagram of a read clock domain crossing synchronization circuit according to an embodiment of the present disclosure.
Figure 7B:
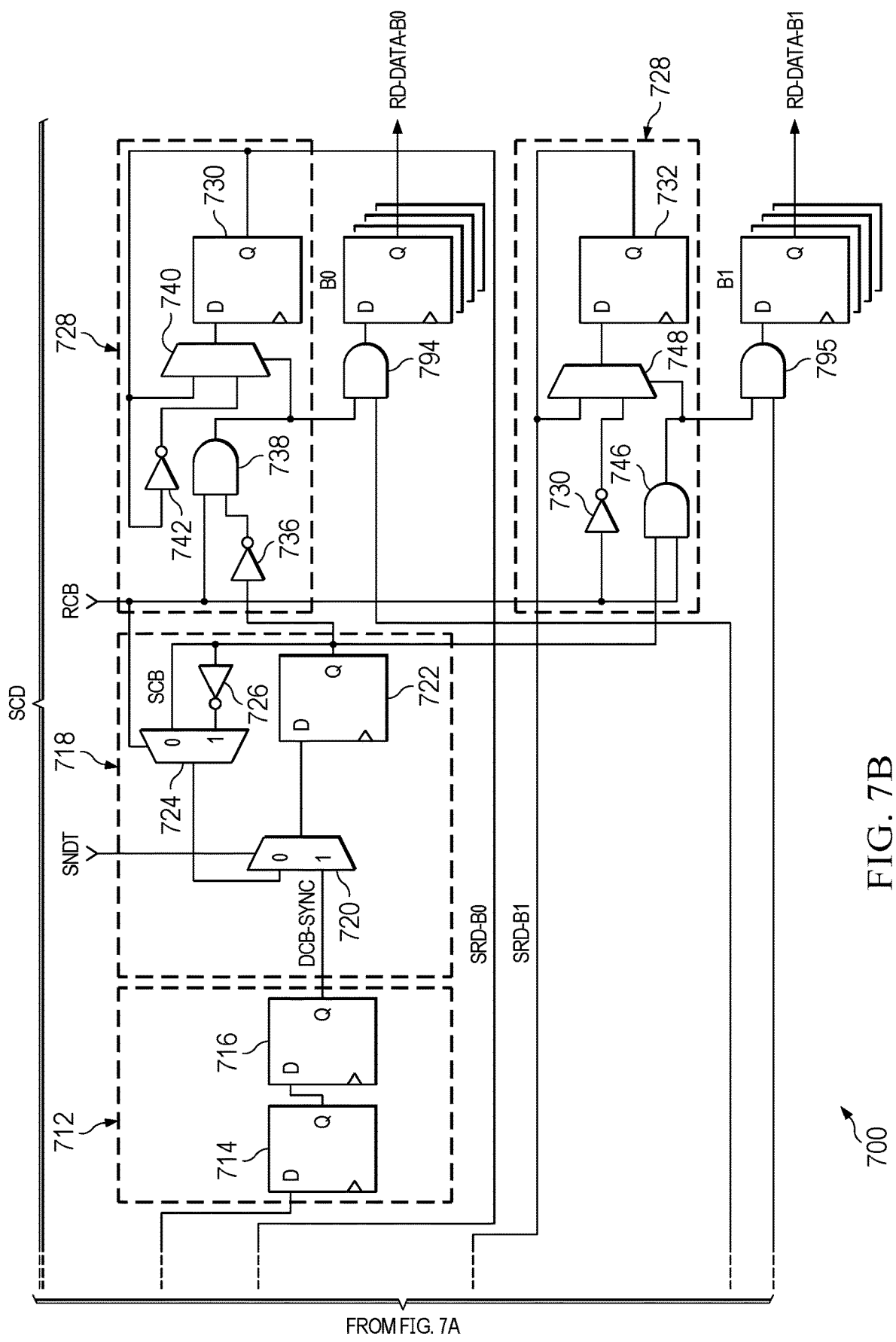

FIG. 6 is a signal timing diagram illustrating operation of the write clock domain crossing synchronization circuit 400 of FIG. 4 in a second example of delaying a write data transfer request. The example of FIG. 6 is similar to that just described for FIG. 5 except the DCB signal initially indicates the current buffer is the data buffer B1 instead of buffer B0. The source data transfer request generator 428 initially, at a time t0, generates the second buffer source write request signal SWR-B1 associated with a write data transfer to be performed with the data buffer B1, and thereafter at a time t1 generates the first buffer source write request signal SWR-B0. At a time t2, corresponding signals generated in the destination clock domain DCD based on the SWR-B0 and SWR-B1 signals from the source clock domain SCD are shown, specifically the SWR-B0-SYNC and SWR-B1-SYNC signals from the synchronization circuit 452, along with the write first and second buffer pulse signals WR-B0, WR-B1 from the destination data transfer request and delay generator 462. Once again, synchronization has been lost with these signals, with the transitions for all the signals occurring at approximately t2.

In the example of FIG. 6, the write data transfer associated with the SWR-B1 signal is processed first in the destination clock domain DCD to transfer write data from the data buffer B1 to the FIFO memory 410. This is seen in the signal timing diagram as the write first buffer pulse signal WR-B1 is asserted from time t2 to time t3. This signal is associated with or corresponds to a write transfer with first data buffer B1, and during this time the DCB signal indicates the first data buffer B1 is the current buffer. Thus, this write transfer associated with buffer B1 is processed first. In addition, the transition of the WR-B0 signal while the DCB signal indicates the current buffer is data buffer B1 results in generation of the active delayed write second buffer signal D-WR-B0 at time t3. As a result, when the value of the DCB signal changes state at time t3 to indicate the current buffer is data buffer B0, the write transfer associated with the SWR-B0 signal is performed. Thus, both the write transfers associated with the SWR-B0 and SWR-B1 signals are one again performed, albeit in a reverse order when compared to the example of FIG. 5. Both write transfers are once again performed notwithstanding the loss synchronization of the associated signals in the destination clock domain DCD.

FIG. 7 is a more detailed functional block diagram of a read clock domain crossing synchronization circuit 700 according to an embodiment of the present disclosure. The clock domain crossing synchronization circuit 300 of FIG. 3 includes the write clock domain crossing synchronization circuit 400 of FIG. 4 as well as a read clock domain crossing synchronization circuit 700 as shown in FIG. 7 to provide synchronization for both read and write data transfers between the source clock domain SCD and destination clock domain DCD. The read clock domain crossing synchronization circuit 700 includes components 700-795, which substantially correspond to components 400-495 in the write clock domain crossing synchronization circuit 400 of FIG. 4. Once skilled in the art will understand the operation of synchronization circuit 700 in view of the above description of the synchronization circuits 300 400, and thus, for the sake of brevity, the detailed operation of the synchronization circuit 700 will not be described in detail herein.

Figure 8:
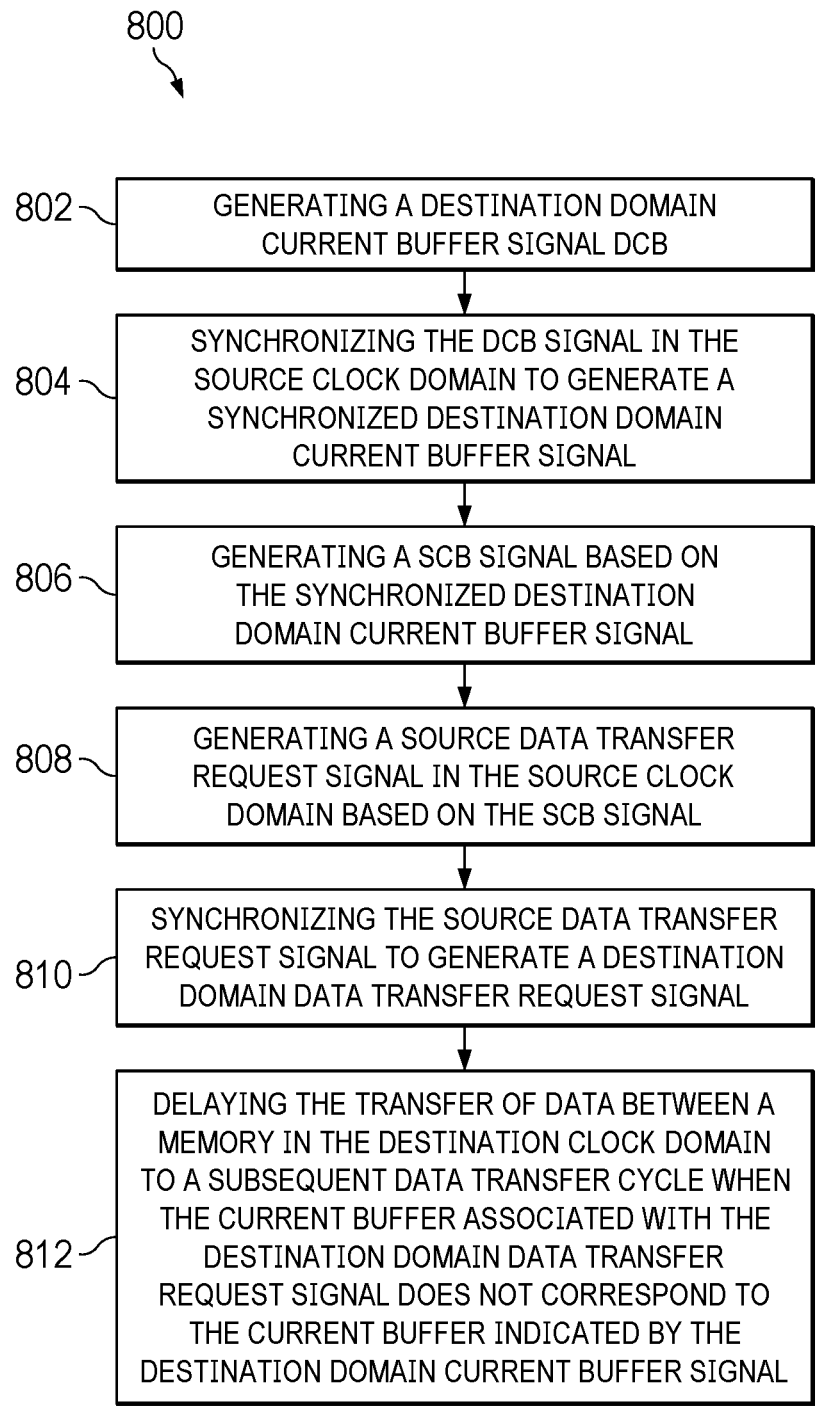
FIG. 8 is a flow chart illustrating a clock domain crossing synchronization method according to an embodiment of the present disclosure.

FIG. 8 is a flow chart illustrating a clock domain crossing synchronization process 800 according to an embodiment of the present disclosure. The process 800 begins at 802 and generates a destination domain current buffer signal in a destination clock domain. The destination domain current buffer signal has a value indicating which one of a first data buffer and a second data buffer in a source clock domain is a current buffer to be utilized during a current data transfer cycle. The method the proceeds to 804 and synchronizes the destination domain current buffer signal in the source clock domain to generate a synchronized destination domain current buffer signal. From 804 the process 800 proceeds to 806 and generates a source domain current buffer signal based on the synchronized destination domain current buffer signal. The generated source domain current buffer signal has a value indicating the current buffer. The process 800 goes from 806 to 808 and generates a source data transfer request signal in the source clock domain based on the source domain current buffer signal. The source data transfer request signal is associated with the current buffer indicated by the source domain current buffer signal. The process 800 then goes to 810 and synchronizes the source data transfer request signal in the destination clock domain to thereby generate a destination domain data transfer request signal. From 810 the process 800 goes to 812 and delays the transfer of data between a memory in the destination clock domain to a subsequent data transfer cycle when the current buffer associated with the destination domain data transfer request signal does not correspond to the current buffer indicated by the destination domain current buffer signal.

Example embodiments of the invention are described below. Other embodiments can also be understood from the entirety of the specification as well as the claims filed herein.

Example 1. A method including: generating a destination domain current buffer signal in a destination clock domain, the destination domain current buffer signal having a value indicating which one of a first data buffer and a second data buffer in a source clock domain is a current buffer to be utilized during a current data transfer cycle; synchronizing the destination domain current buffer signal in the source clock domain to generate a synchronized destination domain current buffer signal; generating a source domain current buffer signal based on the synchronized destination domain current buffer signal, the generated source domain current buffer signal having a value indicating the current buffer; generating a source data transfer request signal in the source clock domain based on the source domain current buffer signal, the source data transfer request signal being associated with the current buffer indicated by the source domain current buffer signal; synchronizing the source data transfer request signal in the destination clock domain to thereby generate a destination domain data transfer request signal; and delaying the transfer of data between a memory in the destination clock domain and the current buffer to a subsequent data transfer cycle when the current buffer associated with the destination domain data transfer request signal does not correspond to the current buffer indicated by the destination domain current buffer signal.

Example 2. The method of example 1, further including transferring data between the memory and the current buffer indicated by the destination domain data transfer request signal when the current buffer associated with the destination domain data transfer request signal corresponds to the current buffer indicated by the destination domain current buffer signal.

Example 3. The method of one of examples 1 or 2, further including changing a state of the destination domain current buffer signal to indicate a start of the next data transfer cycle.

Example 4. The method of one of examples 1 to 3, where delaying the transfer of data further includes: storing an active delayed destination domain data transfer request signal that is associated with the one of first and second data buffers that is not the current buffer; and initiating the transfer of data between the memory and the one of the one of the first and second data buffers that is not the current buffer when the destination domain current buffer signal changes state to indicate the start of the next data transfer cycle.

Example 5. The method of one of examples 1 to 4, where initiating the transfer of data includes activating a memory request signal and where the method further includes changing a state of the destination domain current buffer signal in response to the memory request signal going active.

Example 6. The method of one of examples 1 to 5, further including changing the value of the source domain current buffer signal in response to generating the source domain data transfer request signal.

Example 7. The method of one of examples 1 to 6, where generating the source data transfer request signal includes generating a source domain write first buffer signal and a source domain write second buffer signal, and where generating the destination domain data transfer request signal includes generating a destination domain write first buffer signal and a destination domain write second buffer signal.

Example 8. The method of one of examples 1 to 7, where generating the source data transfer request signal includes generating a source domain read first buffer signal and a source domain read second buffer signal, and where generating the destination domain data transfer request signal includes generating a destination domain read first buffer signal and a destination domain read second buffer signal.

Example 9. A clock domain crossing synchronization circuit, including: a destination current buffer generator in a destination clock domain, the destination current buffer generator configured to generate a destination domain current buffer signal having a value indicating whether a first data buffer or a second data buffer is a current buffer to be utilized in a current data transfer cycle; a first synchronization circuit configured to receive the destination current buffer signal and to generate a corresponding synchronized destination current buffer signal in a source clock domain; a source current buffer generator configured to generate a source domain current buffer signal based on the synchronized destination current buffer signal, where the source domain current buffer signal has a value indicating the current buffer; a source data transfer request generator configured to receive the source domain current buffer signal to and to generate a source data transfer request signal in the source clock domain based on the source domain current buffer signal, the generated source data transfer request signal being associated with the current buffer indicated by the source domain current buffer signal; a second synchronization circuit configured to receive the source data transfer request signal and to generate a corresponding synchronized source data transfer request signal in the destination clock domain; and a destination data transfer request and delay generator in the destination clock domain and configured to receive the synchronized source data transfer request signal and the destination domain current buffer signal, the destination data transfer request and delay generator configured to delay the transfer of data between a memory in the destination clock domain and the current buffer to a subsequent data transfer cycle when the current buffer indicated by the destination domain data transfer request signal does not correspond to the current buffer indicated by the destination domain current buffer signal.

Example 10. The clock domain crossing synchronization circuit of example 9, where each of the first and second synchronization circuits includes a plurality of series-connected flip-flops.

Example 11. The clock domain crossing synchronization circuit of one of examples 9 or 10, where the synchronized destination domain data transfer request signal includes a write first buffer signal and a write second buffer signal, and where the destination data transfer request and delay generator includes: a first pulse generator coupled to receive the write first buffer signal and configured to generate a write first buffer pulse signal in response to the write first buffer signal; a second pulse generator coupled to receive the write second buffer signal and configured to generate a write second buffer pulse signal in response to the write second buffer signal; a first transfer request delay circuit having a first input coupled to receive the destination domain current buffer signal and a second input coupled to receive the write first buffer pulse signal, the first transfer request delay circuit configured to drive a delayed write first buffer signal active in response to the write first buffer pulse signal going active and the destination domain current buffer signal indicating the second buffer is the current buffer in the destination clock domain; a second transfer request delay circuit having a first input coupled to receive the destination domain current buffer signal and a second input coupled to receive the write second buffer pulse signal, the second transfer request delay circuit configured to drive a delayed write second buffer signal active in response to the write second buffer pulse signal going active and the destination domain current buffer signal indicating the first buffer is the current buffer in the destination clock domain; and output logic coupled to the first and second pulse generators to receive the write first buffer pulse signal and write second buffer pulse signal, and coupled to the first and second transfer request delay circuits to receive the delayed write first buffer signal and delayed write second buffer signal, the output logic configured to generate a first buffer write request pulse signal in response to either the write first buffer pulse signal or the delayed write first buffer signal being active, and to generate a second buffer write request pulse signal in response to either the write second buffer pulse signal or the delayed write second buffer signal being active; and a selection circuit coupled to the output logic and having a control input coupled to receive the destination domain current buffer signal, the selection circuit configured to provide the first buffer write request pulse signal to the memory when the destination domain current buffer signal indicates the first buffer is the current buffer in the destination clock domain and to provide the second buffer write request pulse signal to the memory when the destination domain current buffer signal indicates the second buffer is the current buffer in the destination clock domain.

Example 12. The clock domain crossing synchronization circuit of one of examples 9 to 11, where each of the first and second pulse generators includes: a flip-flop having an output and having an input coupled to receive the corresponding one of the write first buffer signal or write second buffer signal; and an XOR gate having a first input coupled to receive the corresponding one of the write first buffer or write second buffer signals and a second input coupled to the output of the flip-flop, the XOR gate having an output configured to generate the corresponding write first buffer pulse signal or write second buffer pulse signal.

Example 13. The clock domain crossing synchronization circuit of one of examples 9 to 12, where the output logic includes: a first OR gate having a first input coupled to receive the write first buffer pulse signal and the delayed write first buffer signal, and configured to generate the first buffer write request pulse signal on an output; and a second OR gate having a first input coupled to receive the write second buffer pulse signal and the delayed write second buffer signal, and configured to generate the second buffer write request signal on an output.

Example 14. The clock domain crossing synchronization circuit of one of examples 9 to 13, where the selection circuit includes a multiplexer having a first input coupled to the output of first OR gate, a second input coupled to the output of the second OR gate, an output coupled to the memory, and a control input coupled to receive the destination domain current buffer signal.

Example 15. The clock domain crossing synchronization circuit of one of examples 9 to 14, where the destination current buffer generator includes: a flip-flop having an input and an output; and a multiplexer having a first input coupled to the output of the flip-flop, a second input receiving the output of the flip-flop through an inverter, an output coupled to the input of the flip-flop, and a control input coupled to receive the data transfer request signal from the destination data transfer request and delay generator.

Example 16. The clock domain crossing synchronization circuit of one of examples 9 to 15, where the source data transfer request signal includes a first buffer source write request signal and a second buffer source write request signal, and where the source data transfer request generator includes: a first-flip flop including an input and having an output configured to generate the first buffer source write request signal; a second flip flop including an input and having an output configured to generate the second buffer source write request signal; and logic circuitry configured to receive a data transfer current buffer signal and the source domain current buffer signal, and coupled to the inputs of the first and second flip-flops, the logic circuitry configured to provide an active signal to the input of the first flip-flop in response to the data transfer current buffer signal going active and the source domain current buffer signal indicating the first data buffer is the current buffer, and to provide an active signal to input of the second flip-flop in response to data transfer current buffer signal going active and the source domain current buffer signal indicating the second data buffer is the current buffer, and the logic circuitry further configured to provide an inactive signal on the input of the first and second flip-flop in response to the first buffer source data transfer request signal and second buffer source data transfer request signal going active, respectively.

Example 17. The clock domain crossing synchronization circuit of one of examples 9 to 16, where the logic circuitry includes: an inverter having an input coupled to receive the source domain current buffer signal and having an output; a first AND gate having a first input coupled to receive a write current buffer signal and a second input coupled to the output of the inverter, and having an output; a first multiplexer having a selection input coupled to the output of the first AND gate, a first input coupled to the output of the first flip-flop, a second input, and an output coupled to the input of the first flip-flop; a second inverter having an output coupled to the second input of first multiplexer and having an input coupled to the output of the first flip-flop to receive the first buffer source write request signal; a second AND gate having a first input coupled to receive the write current buffer signal and a second input coupled to receive the source domain current buffer signal, and having an output; a second multiplexer having a selection input coupled to the output of the second AND gate, a first input coupled to the output of the second flip-flop, a second input, and an output coupled to the input of the second flip-flop; and a third inverter having an output coupled to the second input of the second multiplexer and having an input coupled to the output of the second flip-flop to receive the second buffer source write request signal.

Example 18. The clock domain crossing synchronization circuit of one of examples 9 to 17, where source domain current buffer generator includes: a first multiplexer having a first input coupled to receive the synchronized destination current buffer signal, a second input, an output, and a control input coupled to receive a start new data transfer signal; a flip-flop having an input coupled to the output of the first multiplexer and an output on which the source domain current buffer signal is provided; a second multiplexer having a first input coupled to the output of the flip-flop, a second input, an output coupled to the second input of the first multiplexer, and a control input coupled to receive a write current buffer signal; and an inverter having an input coupled the output of the flip-flop and an output coupled to second input of the second multiplexer.

Example 19. An electronic system includes a first in, first out (FIFO) memory in a destination clock domain; a double buffer including a first data buffer and a second data buffer in a source clock domain; and a clock domain crossing synchronization circuit, including: a destination current buffer generator in the destination clock domain, the destination current buffer generator configured to generate a destination domain current buffer signal having a value indicating either the first data buffer or the second data buffer is the current buffer to be utilized in a current data transfer cycle; a first synchronization circuit configured to receive the destination current buffer signal and to generate a synchronized destination current buffer signal in the source clock domain; a source current buffer generator in the source clock domain, the source current buffer generator configured to generate a source domain current buffer signal based on the synchronized destination current buffer signal, where the source domain current buffer signal has a first value indicating the first data buffer and a second value indicating to the second data buffer; a source data transfer request generator configured to receive the source domain current buffer signal to and to generate a source data transfer request signal in the source clock domain based on the source domain current buffer signal, the generated source data transfer request signal being associated with the one of the first data buffer or second data buffer corresponding to the value of the source domain current buffer signal; a second synchronization circuit configured to receive the source data transfer request signal and to generate a synchronized destination domain data transfer request signal in the destination clock domain; and a destination data transfer request and delay generator in the destination clock domain and configured to receive the synchronized source data transfer request signal and the destination domain current buffer signal, the destination data transfer request and delay generator configured to delay the transfer of data between a memory in the destination clock domain and the current buffer to a subsequent data transfer cycle when the current buffer indicated by the destination domain data transfer request signal does not correspond to the current buffer indicated by the destination domain current buffer signal.

Example 20. The electronic system of example 19, where the source clock domain is a secure digital clock domain and where the destination clock domain is an advanced hardware bus clock domain.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
generating a destination domain current buffer signal in a destination clock domain, the destination domain current buffer signal having a value indicating which one of a first data buffer and a second data buffer in a source clock domain is a current buffer to be utilized during a current data transfer cycle;
synchronizing the destination domain current buffer signal in the source clock domain to generate a synchronized destination domain current buffer signal; generating a source domain current buffer signal based on the synchronized destination domain current buffer signal, the generated source domain current buffer signal having a value indicating the current buffer;
generating a source data transfer request signal in the source clock domain based on the source domain current buffer signal, the source data transfer request signal being associated with the current buffer indicated by the source domain current buffer signal;
synchronizing the source data transfer request signal in the destination clock domain to generate a destination domain data transfer request signal; and delaying the transfer of data between a memory in the destination clock domain and the current buffer to a subsequent data transfer cycle when the current buffer associated with the destination domain data transfer request signal does not correspond to the current buffer indicated by the destination domain current buffer signal.

2. The method of claim 1, further comprising transferring data between the memory and the current buffer indicated by the destination domain data transfer request signal when the current buffer associated with the destination domain data transfer request signal corresponds to the current buffer indicated by the destination domain current buffer signal.

3. The method of claim 1, further comprising changing a state of the destination domain current buffer signal to indicate a start of a next data transfer cycle.

4. The method of claim 3, wherein delaying the transfer of data further comprises:
storing an active delayed destination domain data transfer request signal that is associated with one of the first and second data buffers that is not the current buffer; and
initiating the transfer of data between the memory and the one of the first and second data buffers that is not the current buffer when the destination domain current buffer signal changes state to indicate the start of the next data transfer cycle.

5. The method of claim 4, wherein initiating the transfer of data comprises activating a memory request signal and wherein the method further comprises changing a state of the destination domain current buffer signal in response to the memory request signal going active.

6. The method of claim 5, further comprising changing the value of the source domain current buffer signal in response to generating the source data transfer request signal.

7. The method of claim 1, wherein generating the source data transfer request signal comprises generating a source domain write first buffer signal and a source domain write second buffer signal, and wherein generating the destination domain data transfer request signal comprises generating a destination domain write first buffer signal and a destination domain write second buffer signal.

8. The method of claim 1, wherein generating the source data transfer request signal comprises generating a source domain read first buffer signal and a source domain read second buffer signal, and wherein generating the destination domain data transfer request signal comprises generating a destination domain read first buffer signal and a destination domain read second buffer signal.

9. A clock domain crossing synchronization circuit, comprising:
    a destination current buffer generating circuit in a destination clock domain, the destination current buffer generating circuit configured to generate a destination domain current buffer signal having a value indicating whether a first data buffer or a second data buffer is a current buffer to be utilized in a current data transfer cycle;
    a first synchronization circuit configured to receive the destination current buffer signal and to generate a corresponding synchronized destination current buffer signal in a source clock domain;
    a source current buffer generating circuit configured to generate a source domain current buffer signal based on the corresponding synchronized destination current buffer signal, wherein the source domain current buffer signal has a value indicating the current buffer;
    a source data transfer request generating circuit configured to receive the source domain current buffer signal to generate a source data transfer request signal in the source clock domain based on the source domain current buffer signal, the generated source data transfer request signal being associated with the current buffer indicated by the source domain current buffer signal;
    a second synchronization circuit configured to receive the source data transfer request signal and to generate a corresponding synchronized destination data transfer request signal in the destination clock domain; and
    a destination data transfer request and delay generating circuit in the destination clock domain and configured to receive the synchronized source data transfer request signal and the destination domain current buffer signal, the destination data transfer request and delay generating circuit configured to delay the transfer of data between a memory in the destination clock domain and the current buffer to a subsequent data transfer cycle when the current buffer indicated by a destination domain data transfer request signal does not correspond to the current buffer indicated by the destination domain current buffer signal.

10. The clock domain crossing synchronization circuit of claim 9, wherein each of the first and second synchronization circuits comprises a plurality of series-connected flip-flops.

11. The clock domain crossing synchronization circuit of claim 9, wherein the synchronized destination domain data transfer request signal comprises a write first buffer signal and a write second buffer signal, and wherein the destination data transfer request and delay generator comprises:
    a first pulse generating circuit coupled to receive the write first buffer signal and configured to generate a write first buffer pulse signal in response to the write first buffer signal;
    a second pulse generating circuit coupled to receive the write second buffer signal and configured to generate a write second buffer pulse signal in response to the write second buffer signal;
    a first transfer request delay circuit having a first input coupled to receive the destination domain current buffer signal and a second input coupled to receive the write first buffer pulse signal, the first transfer request delay circuit configured to drive a delayed write first buffer signal active in response to the write first buffer pulse signal going active and the destination domain current buffer signal indicating the second buffer is the current buffer in the destination clock domain;
    a second transfer request delay circuit having a first input coupled to receive the destination domain current buffer signal and a second input coupled to receive the write second buffer pulse signal, the second transfer request delay circuit configured to drive a delayed write second buffer signal active in response to the write second buffer pulse signal going active and the destination domain current buffer signal indicating the first buffer is the current buffer in the destination clock domain; and
    output logic coupled to the first and second pulse generating circuits to receive the write first buffer pulse signal and write second buffer pulse signal, and coupled to the first and second transfer request delay circuits to receive the delayed write first buffer signal and delayed write second buffer signal, the output logic configured to generate a first buffer write request pulse signal in response to either the write first buffer pulse signal or the delayed write first buffer signal being active, and to generate a second buffer write request pulse signal in response to either the write second buffer pulse signal or the delayed write second buffer signal being active; and
    a selection circuit coupled to the output logic and having a control input coupled to receive the destination domain current buffer signal, the selection circuit configured to provide the first buffer write request pulse signal to the memory when the destination domain current buffer signal indicates the first buffer is the current buffer in the destination clock domain and to provide the second buffer write request pulse signal to the memory when the destination domain current buffer signal indicates the second buffer is the current buffer in the destination clock domain.

12. The clock domain crossing synchronization circuit of claim 11, wherein each of the first and second pulse generating circuits comprises:
    a flip-flop having an output and having an input coupled to receive the corresponding one of the write first buffer signal or write second buffer signal; and
    an XOR gate having a first input coupled to receive the corresponding one of the write first buffer or write second buffer signals and a second input coupled to the output of the flip-flop, the XOR gate having an output configured to generate the corresponding write first buffer pulse signal or write second buffer pulse signal.

13. The clock domain crossing synchronization circuit of claim 11, wherein the output logic comprises:
a first OR gate having a first input coupled to receive the write first buffer pulse signal and the delayed write first buffer signal, and configured to generate the first buffer write request pulse signal on an output; and
a second OR gate having a first input coupled to receive the write second buffer pulse signal and the delayed write second buffer signal, and configured to generate the second buffer write request signal on an output.

14. The clock domain crossing synchronization circuit of claim 13, wherein the selection circuit comprises a multiplexer having a first input coupled to the output of the first OR gate, a second input coupled to the output of the second OR gate, an output coupled to the memory, and a control input coupled to receive the destination domain current buffer signal.

15. The clock domain crossing synchronization circuit of claim 9, wherein the destination current buffer generating circuit comprises:
a flip-flop having an input and an output; and
a multiplexer having a first input coupled to the output of the flip-flop, a second input receiving the output of the flip-flop through an inverter, an output coupled to the input of the flip-flop, and a control input coupled to receive the data transfer request signal from the destination data transfer request and delay generating circuit.

16. The clock domain crossing synchronization circuit of claim 9, wherein the source data transfer request signal includes a first buffer source write request signal and a second buffer source write request signal, and wherein the source data transfer request generating circuit comprises:
a first flip-flop including an input and having an output configured to generate the first buffer source write request signal;
a second flip-flop including an input and having an output configured to generate the second buffer source write request signal; and
logic circuitry configured to receive a data transfer current buffer signal and the source domain current buffer signal, and coupled to the inputs of the first and second flip-flops, the logic circuitry configured to provide an active signal to the input of the first flip-flop in response to the data transfer current buffer signal going active and the source domain current buffer signal indicating the first data buffer is the current buffer, and to provide an active signal to input of the second flip-flop in response to data transfer current buffer signal going active and the source domain current buffer signal indicating the second data buffer is the current buffer, and the logic circuitry further configured to provide an inactive signal on the input of the first and second flip-flops in response to a first buffer source data transfer request signal and second buffer source data transfer request signal going active, respectively.

17. The clock domain crossing synchronization circuit of claim 16, wherein the logic circuitry comprises:
an inverter having an input coupled to receive the source domain current buffer signal and having an output;
a first AND gate having a first input coupled to receive a write current buffer signal and a second input coupled to the output of the inverter, and having an output;
a first multiplexer having a selection input coupled to the output of the first AND gate, a first input coupled to the output of the first flip-flop, a second input, and an output coupled to the input of the first flip-flop;
a second inverter having an output coupled to the second input of the first multiplexer and having an input coupled to the output of the first flip-flop to receive the first buffer source write request signal;
a second AND gate having a first input coupled to receive the write current buffer signal and a second input coupled to receive the source domain current buffer signal, and having an output;
a second multiplexer having a selection input coupled to the output of the second AND gate, a first input coupled to the output of the second flip-flop, a second input, and an output coupled to the input of the second flip-flop; and
a third inverter having an output coupled to the second input of the second multiplexer and having an input coupled to the output of the second flip-flop to receive the second buffer source write request signal.

18. The clock domain crossing synchronization circuit of claim 16, wherein source domain current buffer generating circuit comprises:
a first multiplexer having a first input coupled to receive the synchronized destination current buffer signal, a second input, an output, and a control input coupled to receive a start new data transfer signal;
a flip-flop having an input coupled to the output of the first multiplexer and an output on which the source domain current buffer signal is provided;
a second multiplexer having a first input coupled to the output of the flip-flop, a second input, an output coupled to the second input of the first multiplexer, and a control input coupled to receive a write current buffer signal; and
an inverter having an input coupled to the output of the flip-flop and an output coupled to second input of the second multiplexer.

19. An electronic system, comprising:
a first in, first out (FIFO) memory in a destination clock domain;
a double buffer including a first data buffer and a second data buffer in a source clock domain; and
a clock domain crossing synchronization circuit, including:
a destination current buffer generating circuit in the destination clock domain, the destination current buffer generating circuit configured to generate a destination domain current buffer signal having a value indicating either the first data buffer or the second data buffer is the current buffer to be utilized in a current data transfer cycle;
a first synchronization circuit configured to receive the destination current buffer signal and to generate a synchronized destination current buffer signal in the source clock domain;
a source current buffer generating circuit in the source clock domain, the source current buffer generating circuit configured to generate a source domain current buffer signal based on the synchronized destination current buffer signal, where the source domain current buffer signal has a first value indicating the first data buffer and a second value indicating to the second data buffer;
a source data transfer request generating circuit configured to receive the source domain current buffer signal to generate a source data transfer request signal in the source clock domain based on the source domain current buffer signal, the generated source data transfer request signal being associated with the one of the first data buffer or second data buffer corresponding to the value of the source domain current buffer signal;

a second synchronization circuit configured to receive the source data transfer request signal and to generate a synchronized destination domain data transfer request signal in the destination clock domain; and a destination data transfer request and delay generating circuit in the destination clock domain and configured to receive the corresponding synchronized source data transfer request signal and the destination domain current buffer signal, the destination data transfer request and delay generating circuit configured to delay the transfer of data between a memory in the destination clock domain and the current buffer to a subsequent data transfer cycle when the current buffer indicated by the destination domain data transfer request signal does not correspond to the current buffer indicated by the destination domain current buffer signal.

20. The electronic system of claim 19, wherein the source clock domain is a secure digital clock domain and wherein the destination clock domain is an advanced hardware bus clock domain.

* * * * *